/

US007110958B2

(12) United States Patent
Yang

(10) Patent No.: US 7,110,958 B2
(45) Date of Patent: Sep. 19, 2006

(54) METHOD AND APPARATUS FOR MOBILE PICKUP STATIONS

(76) Inventor: Ping Yang, 13879 Silverwood La., Chino Hills, CA (US) 91709

(*) Notice: Subject to any disclaimer, the term of this patent is extended or adjusted under 35 U.S.C. 154(b) by 726 days.

(21) Appl. No.: 09/733,873

(22) Filed: Dec. 8, 2000

(65) Prior Publication Data

US 2002/0072945 A1   Jun. 13, 2002

(51) Int. Cl.
*G06Q 10/00* (2006.01)
(52) U.S. Cl. ............................................. 705/8; 705/26
(58) Field of Classification Search ................ 705/1, 705/7, 8, 9, 23, 26, 28; 700/231, 232, 237
See application file for complete search history.

(56) References Cited

U.S. PATENT DOCUMENTS

| 4,797,818 | A | | 1/1989 | Cotter |
| 5,158,155 | A | | 10/1992 | Domain et al. |
| 5,440,479 | A | | 8/1995 | Hutton |
| 5,559,707 | A | | 9/1996 | DeLorme |
| 5,845,263 | A | | 12/1998 | Camaisa et al. |
| 5,852,810 | A | | 12/1998 | Sotiroff et al. |
| 5,890,136 | A | | 3/1999 | Kipp |
| 5,971,273 | A | | 10/1999 | Vallaire |
| 5,991,739 | A | | 11/1999 | Cupps |
| 6,026,375 | A | | 2/2000 | Hall |
| 6,085,170 | A | * | 7/2000 | Tsukuda ...................... 705/26 |
| 6,202,023 | B1 | * | 3/2001 | Hancock et al. ............ 701/201 |
| 6,321,158 | B1 | * | 11/2001 | DeLorme et al. ........... 701/201 |
| 6,343,317 | B1 | | 1/2002 | Glorikian .................... 709/218 |
| 6,456,900 | B1 | | 9/2002 | Kakuta |
| 6,459,986 | B1 | | 10/2002 | Boyce |
| 6,480,758 | B1 | | 11/2002 | Stevens ........................ 700/244 |
| 6,498,982 | B1 | | 12/2002 | Bellesfield |
| 6,614,363 | B1 | * | 9/2003 | Behr et al. .............. 340/995.19 |
| 6,688,435 | B1 | | 2/2004 | Will et al. ...................... 186/35 |
| 6,690,997 | B1 | * | 2/2004 | Rivalto ......................... 700/237 |
| 6,882,269 | B1 | * | 4/2005 | Moreno ....................... 340/5.73 |
| 2001/0042024 | A1 | * | 11/2001 | Rogers ........................ 705/26 |
| 2002/0035515 | A1 | * | 3/2002 | Moreno ........................ 705/26 |
| 2002/0077937 | A1 | * | 6/2002 | Lyons et al. ................... 705/28 |
| 2002/0111914 | A1 | * | 8/2002 | Terada et al. .................. 705/60 |
| 2005/0131774 | A1 | * | 6/2005 | Huxter .......................... 705/26 |

FOREIGN PATENT DOCUMENTS

JP          411141208 A   *   5/1999

OTHER PUBLICATIONS

Web pages for McDonald's Trip Planner and Search Results, URL:http://www.vicinity.com/mcdonalds.
Web pages for FreshDirect with Article entitled Can FreshDirect Bring Home the Bacon? Business Week Online Sep. 25, 2002 URL:http://www.freshdirect.com

* cited by examiner

*Primary Examiner*—Tariq R. Hafiz
*Assistant Examiner*—B. Van Doren
(74) *Attorney, Agent, or Firm*—Cislo & Thomas, LLP

(57) ABSTRACT

A method and system for scheduling delivery and delivery of products to buyers. A Mobile Pickup Station (MPS) server is placed within a computer network and receives product shipping instructions from buyers or third party sellers. The MPS server determines optimal pickup points using buyer commuting information and buyer delivery requests. A MPS, carrying a buyer's products, is dispatched to an optimal pickup point chosen by the buyer. A MPS may be used to both deliver and receive products. In an alternative embodiment, a MPS server finds stores with buyer desired products along the buyer's commuting route.

59 Claims, 16 Drawing Sheets

METHOD AND APPARATUS FOR MOBILE PICKUP STATIONS

BACKGROUND OF THE INVENTION

This invention relates generally to the field of shipping and more specifically to the delivery of goods purchased from a distant location.

Conventionally, products that are ordered by consumers, whether are ordered on the Internet or by other means, are delivered primarily in two ways. In the first way, the buyer/consumer travels to the seller's store and picks up products ordered there. The second way, the seller ships the products to the buyer via common carriers and buyer receives products at the address designated. Both ways are inefficient. The first method costs the buyer the time and energy expended traveling to the seller's store to pickup products ordered. The second method on the other hand, costs the buyer shipping and handling charges and usually takes a considerable amount of delivery time for the products to be shipped.

The following patents generally indicate the level and depth of prior art shipping systems.

In U.S. Pat. No. 5,991,739, Cupps et al. disclose a system and method for providing an online ordering machine that manages the distribution of home delivered products over a distributed computer system. The patentee discloses that "The online ordering machine provides the customers with product information form various vendors whose delivery range is within the customer's location or with product information from vendors having a take out service within a specified range from the customer's location."

In U.S. Pat. No. 6,026,375 Hall et al, disclose methods and systems for processing an order form a mobile customer and with the use of a method of global tracking a determination is made as to the completion of the order at a certain location at a certain time for the customer's arrival at that location.

Neither invention discloses a method and system that allows the seller to conveniently place a pickup station, which is mobile in nature and is easy to relocate, to a place close to the user's daily commute route and thereby provides maximum convenience for the buyer/user to pickup products ordered.

A conventional delivery system can be inefficient. Besides the problems conventional delivery system faced as previously discussed, the delivery of products to a buyer's address, normally made during daytime, can be troublesome. The buyer may not be present at the buyer's address to receive the products and the products may either be left unattended at the buyer's address or the buyer has to pick the product's up later at a common carrier's office. Even when a delivery is made to an office location where presumably someone will be at the address to receive the products, problems may exist. This is because the common carrier comes and goes following its delivery route and those buyers at the end of the delivery route may waste a significant amount of time waiting for the products to arrive. This waste of time may be crucial and can't be remedied unless a buyer pays a higher price for a faster delivery.

As we move into the Internet era, more and more people shop on the Internet. But lots of people are turned away from Internet purchasing because the long delivery time and expensive delivery charges involved.

An improved delivery system providing a more efficient way of delivery is, therefore, needed. The present invention meets such need.

SUMMARY OF THE INVENTION

It is an object of the present invention to provide a delivery system that is convenient for a buyer to receive products ordered by the buyer.

It is another object of the present invention to provide an efficient delivery method by avoiding costs associated with door-to-door delivery.

It is another object the present invention to deliver products to a buyer face-to-face thus eliminating the risk of leaving products at a buyer's address and leaving the products unattended when the buyer is not at the address to receive the products.

It is another object of the present invention to allow a distant third party seller to arrange to have a buyer quickly receive an ordered product.

It is another object of the present invention to allow a buyer to specify a commuting route and search for stores within a specified distance from the commuting route.

In one embodiment of the invention, scheduling and delivery of a product to a buyer along the buyer's commuting route is accomplished by receiving route information from a buyer. This route information is combined with a channel width to compute channel area. The channel width is the distance from the route the buyer is willing to travel to pickup a product. A set of pickup points is selected from a plurality of pickup points based on the channel area. The buyer then selects from the set pickup points a preferred pickup point. A mobile pickup station is then dispatched to the pickup point containing the product ordered by the buyer.

In another embodiment of the invention, the channel area is used in conjunction with a store database to find a store within the channel area.

In another embodiment of the invention, products are automatically ordered and scheduled for delivery to the buyer based on the buyer's preferences.

BRIEF DESCRIPTION OF THE DRAWINGS

The features, aspects, and advantages of the present invention will become better understood with regard to the following detailed description, accompanying drawings, and appendix where:

FIG. 6 shows selection of mobile pickup point with new user joining in;

DETAILED DESCRIPTION

The present invention is referred to herein a mobile pickup station (MPS) delivery system. A MPS delivery system uses pickup stations in the form of vehicles or movable kiosks used in conjunction with the Internet to provide maximum convenience for a buyer to pickup products. A mobile pickup station may be stationed along a buyer's frequent commuting route so that a buyer can conveniently pickup products at these stations when traveling via the buyer's usual commute route without spending extra time traveling to a seller's store to pickup products.

Most people commute to work via the same commuting route everyday. Others, while not working, go to the same place repeatedly. Even the time people start and end their commuting and the time spent on commuting are about the same day after day. The mobile pickup station system encompasses this highly routine human behavior by arranging to ship products a buyer ordered to a location that is close to the buyer's daily commuting route. Under such an arrangement, a buyer can pickup the products while conducting the buyer's daily commuting without spending extra time to travel to a seller's store for picking up and therefore making it convenient for the buyer to receive products. This pickup location will be referred to herein as the mobile pickup point.

Figure 16:
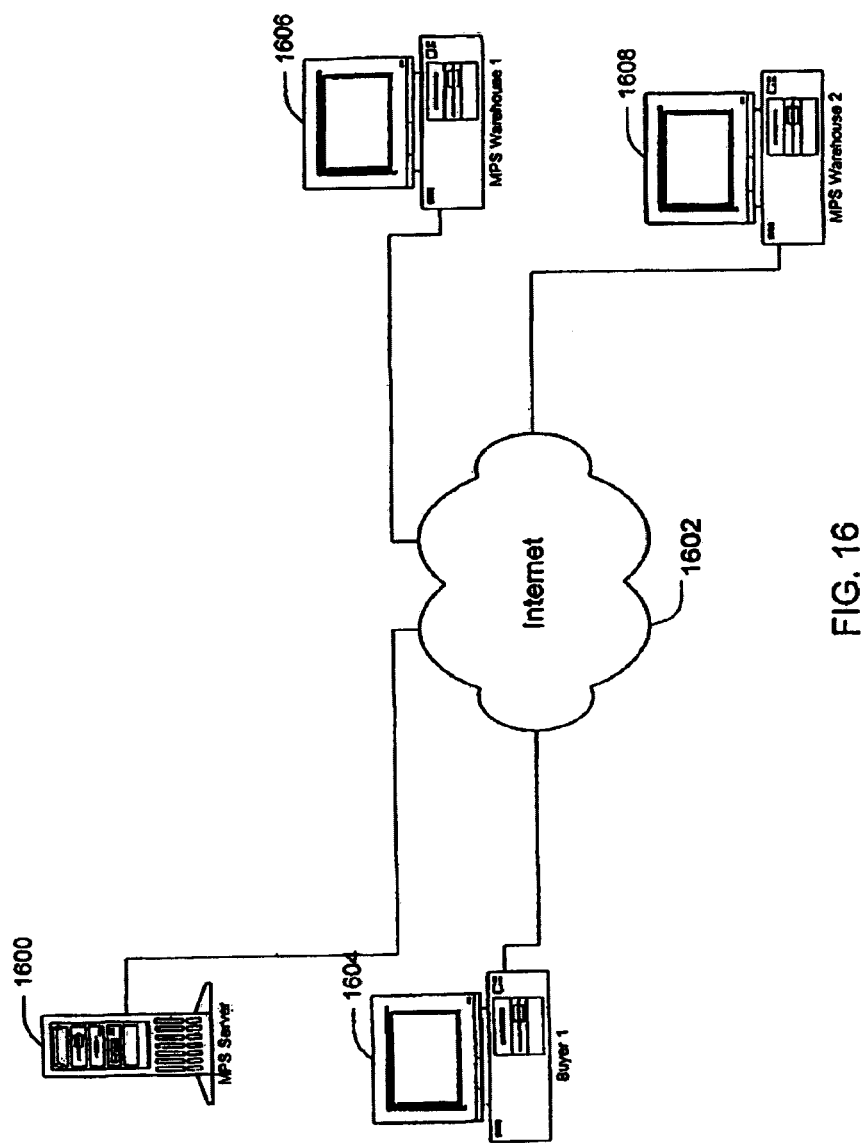
FIG. 16 is a network diagram depicting an embodiment of a MPS using the Internet as a communications medium.

FIG. 16 is a network diagram showing an embodiment of an MPS server using the Internet. A MPS server 1660 is operatively coupled to the Internet 1604 via a communications link 1603 adapted for communications using the Transmission Control Protocol/Internet Protocol (TCP/IP) suite of networking protocols such as Hyper Text Transfer Protocol (HTTP) for hypertext document transfer and Simple Mail Transfer Protocol (SMTP) for the transfer of electronic (email) messages.

Figure 17:
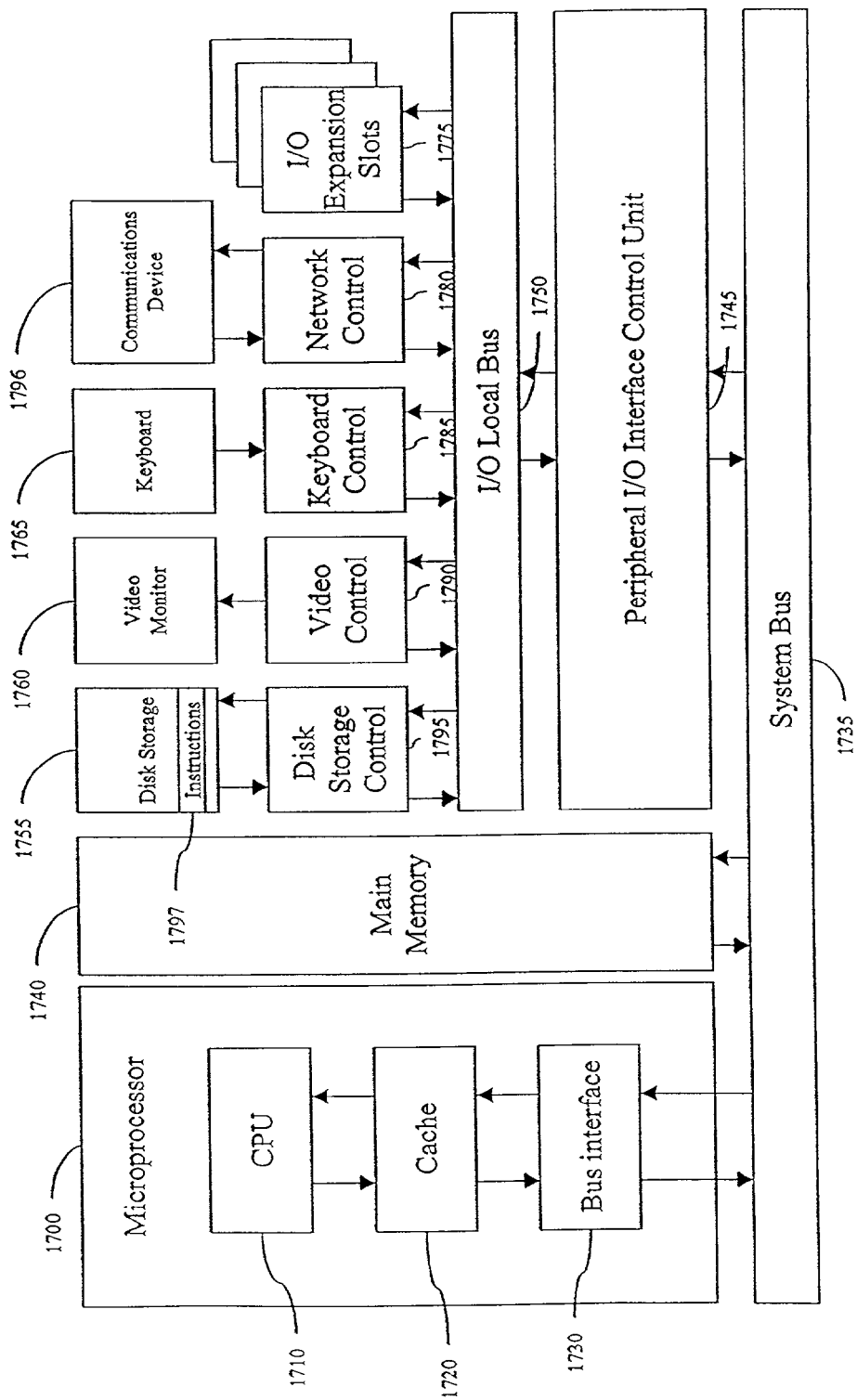
FIG. 17 is a diagram of a computer architecture of a general purpose computer capable of hosting a mobile pickup station server.

FIG. 17 is a hardware architecture diagram of a general purpose computer suitable for use as a MPS server host. Microprocessor 1700, comprised of a Central Processing Unit (CPU) 1710, memory cache 1720, and bus interface 1730, is operatively coupled via system bus 1735 to main memory 1740 and I/O control unit 1745. The I/O interface control unit is operatively coupled via I/O local bus 1750 to disk storage controller 1795, video controller 1790, keyboard controller 1785, and communications device 1780. The communications device is adapted to allow software objects hosted by the general purpose computer to communicate via a network with other software objects. The disk storage controller is operatively coupled to disk storage device 1725. The video controller is operatively coupled to video monitor 1760. The keyboard controller is operatively coupled to keyboard 1765. The network controller is operatively coupled to communications device 1796. The communications device provides a communications link adapted for communications over the Internet.

Computer program instructions 1797 implementing a MPS server are stored on the disk storage device until the microprocessor retrieves the computer program instructions and stores them in the main memory. The microprocessor then executes the computer program instructions stored in the main memory to implement a MPS server.

Referring again to FIG. 16, A buyer using a computer 1604 running a an Internet browser to access the MPS server via the Internet. The buyer's computer is operatively coupled to the Internet via a communications link adapted for communications using TCP/IP based networking protocols such as HTTP for hypertext document transfer. The MPS server provides scheduling services for at least one regionally distributed MPS warehouse. Each MPS warehouse communicates with the MPS via the Internet using computers as exemplified by MPS warehouse computers 1606 and 1608. Each MPS warehouse computer is operatively coupled to the Internet via a communications link adapted for communications using TCP/IP based networking protocols such as HTTP for hypertext document transfer and SMTP for the transfer of email messages.

In operation, a buyer accesses the MPS server via the Internet and uses the delivery scheduling services of the MPS server to define a pickup point to be used by the buyer. The MPS server determines which MPS warehouse is to be used to dispatch a MPS to the defined pickup point with the buyer's products.

Figure 5:
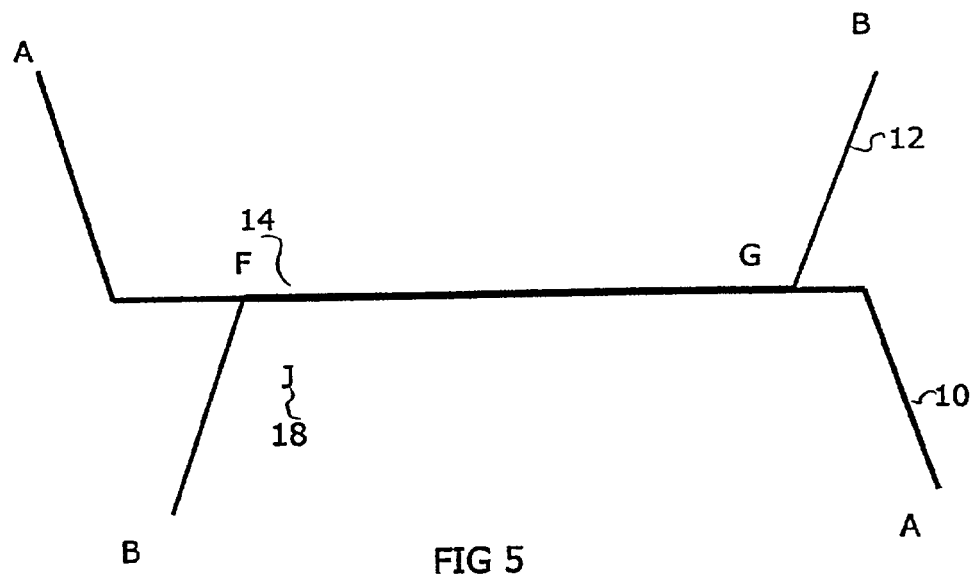
FIG. 5 shows selection of mobile pickup point with two users.

Referring to FIG. 5, user A and user B use the Internet for shopping and order products at the server's website. User A and user B identify their daily preferred commute route as route segment AA 10 and route segment BB 12 respectively. An MPS system stores this route segment information in its permanent memory. Route segment FG 14 is a route segment common to both route segment AA and route segment BB. A MPS system may achieve maximum convenience for both user A and user B by sending a MPS station which carries products ordered by user A and user B and stations at a place that is common to route segments AA and BB (e.g. point J 18) to wait for user A and user B to pickup their ordered products.

A MPS is a vehicle or a movable kiosk that has the capacity to carry products. For instance, in addition to the ability to carry general non-perishable products, an MPS may be equipped with an electricity generator that may power a refrigerator to carry food or floral products during summer, or a MPS may be equipped with a heating device to keep food products at an elevated temperature during winter . . . etc. An ideal MPS mobile pickup point (e.g. point J) is a place that is close to the overlapped user route (e.g. route segment FG), is easy to get access to from the user route and is convenient for the user to park or to walk to. It may be the parking lot of a shopping mall, a gas station or a wide street with capacity to park a MPS and user cars.

A mobile pickup point may also be a place where the MPS system can station a movable kiosk, such as subway station or at a street crossing . . . etc. A MPS stays at the pickup point for a determined period of time waiting for users to pickup their orders. If the MPS station is a vehicle, an operator drives the station to the designated pickup point and stays there. If the MPS station is a movable kiosk, a truck may drop the kiosk at the designated pickup point and pick it up and return the MPS to a MPS warehouse when the station time is over for reloading.

In one embodiment of a MPS, one or more attendants operate the station by helping buyers obtain the buyer's products.

Figure 6:
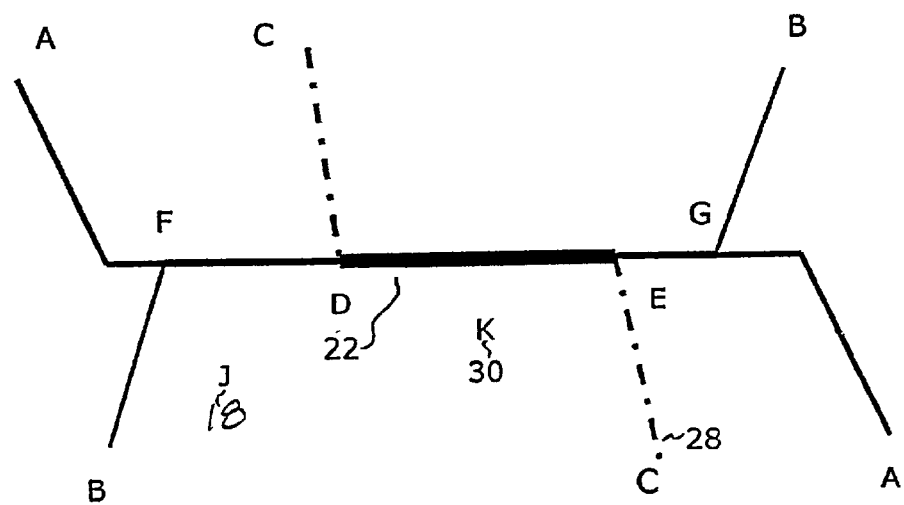

Referring to FIG. 6, assume user C joint a MPS system serving user A and user B. Further assume user C takes commuting route segment CC 28. Because pickup point J 18 is not within user C's commute route CC, the MPS system, in order to achieve maximum convenience to all users A, B, and C, must select a different pickup point to accommodate A, B, and C simultaneously. Point K 30, which is along route segment DE 22 and is common to all route segments AA, BB and CC, can thus be selected as a pickup point to serve users A, B, and C.

Figure 1:
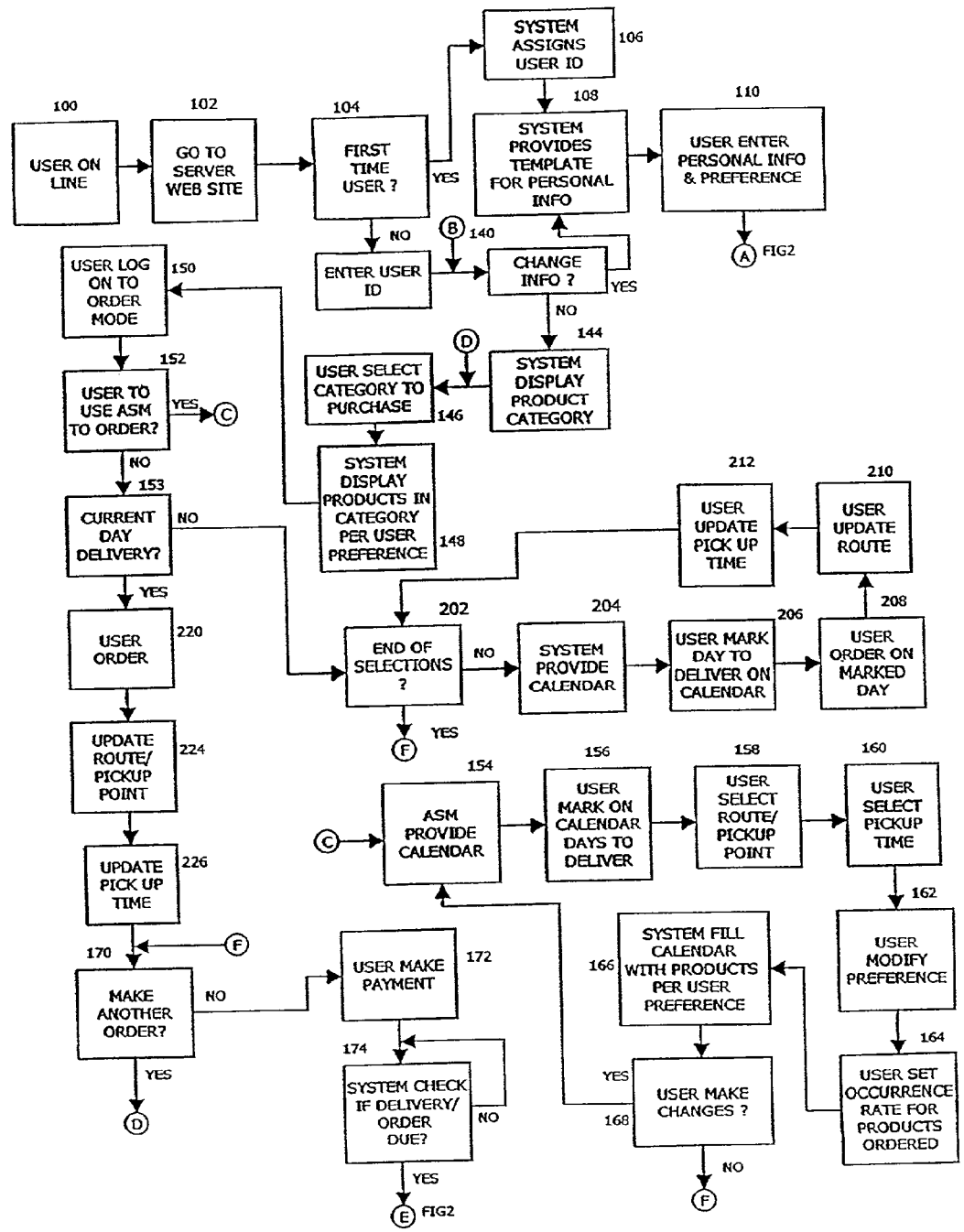
FIGS. 1, 2 are flowcharts showing the process from user's commuting route selection to user pickup at a mobile pickup station.

Referring to FIG. 1, a buyer uses at step 100 the Internet to access a Website using a personal computer (PC), a laptop, a palm pilot or any other means capable of accessing the Internet. The buyer is the person who purchases a product and/or MPS service from the Website. In the case where the Website is maintained by a transportation business entity providing MPS delivery services without selling any physical products, the buyer is the one who uses MPS services to have their products delivered.

The buyer goes to the Website hosted by a MPS server at step 102. An MPS server is a server maintained by a business entity that operates a MPS system. It may be a retail or wholesale business entity with a fleet of MPS stations. It may be a transportation business entity, which operates a fleet of MPSs and delivers products for its customers. Or it may be other kind of business entities, which operates a fleet of MPSs.

The server asks if the buyer is a first time buyer at step 104. If the buyer is a first time buyer, the system assigns the buyer an ID and a password for his use at step 106. The server provides a template for the buyer to enter his personal information at step 108.

The buyer may enter personal information such as name, address, phone number, age, credit card number, etc at step 110. At this stage, the server asks the buyer to enter preference of purchases. This preference is important because it will be a tool the server uses later to screen products and display preferred products to the buyer. For example, if the server is maintained by a food manufacturing company, e.g. a food catering business, preference questions listed may be: does the buyer likes hot and spicy food? Should the food be slightly hot, medium hot, or very hot? If the buyer cares for red meat in the food? Maximum calorie count, fat count in the food, the buyer likes Italian food, Japanese food or others . . . etc. Also the preference questions may contain dollar limitations the buyer wants to spend on meals.

Figure 2:
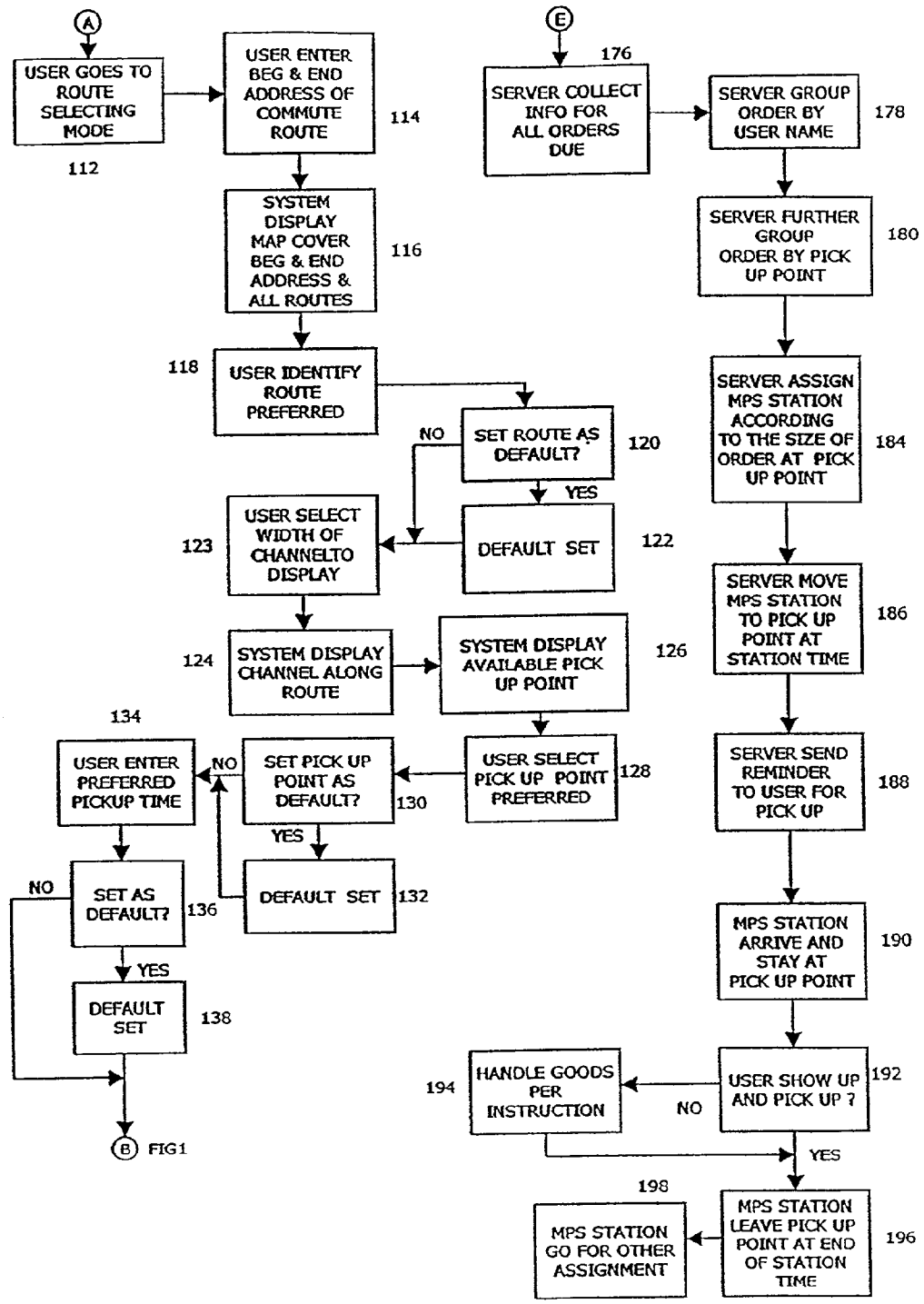

Referring to FIG. 2, the buyer then goes to a route-selecting mode at step 112 to choose a commuting route. In this mode, a template is presented to the buyer to enter the beginning and the end addresses of the buyer's commuting route at step 114. Once the beginning and the end address of route are defined, the MPS server displays a map with all the possible routes involved at step 116. The buyer then clicks or depresses and drags the mouse key on the map described in FIG. 7 to define the buyer's chosen route at step 118.

The buyer can choose to set the chosen route as a default route at steps at step 120 and at step 122. If the chosen route is a temporary route because the buyer is temporarily traveling along a new commute route, the buyer may not want to set the chosen route as a default route.

Figure 7:
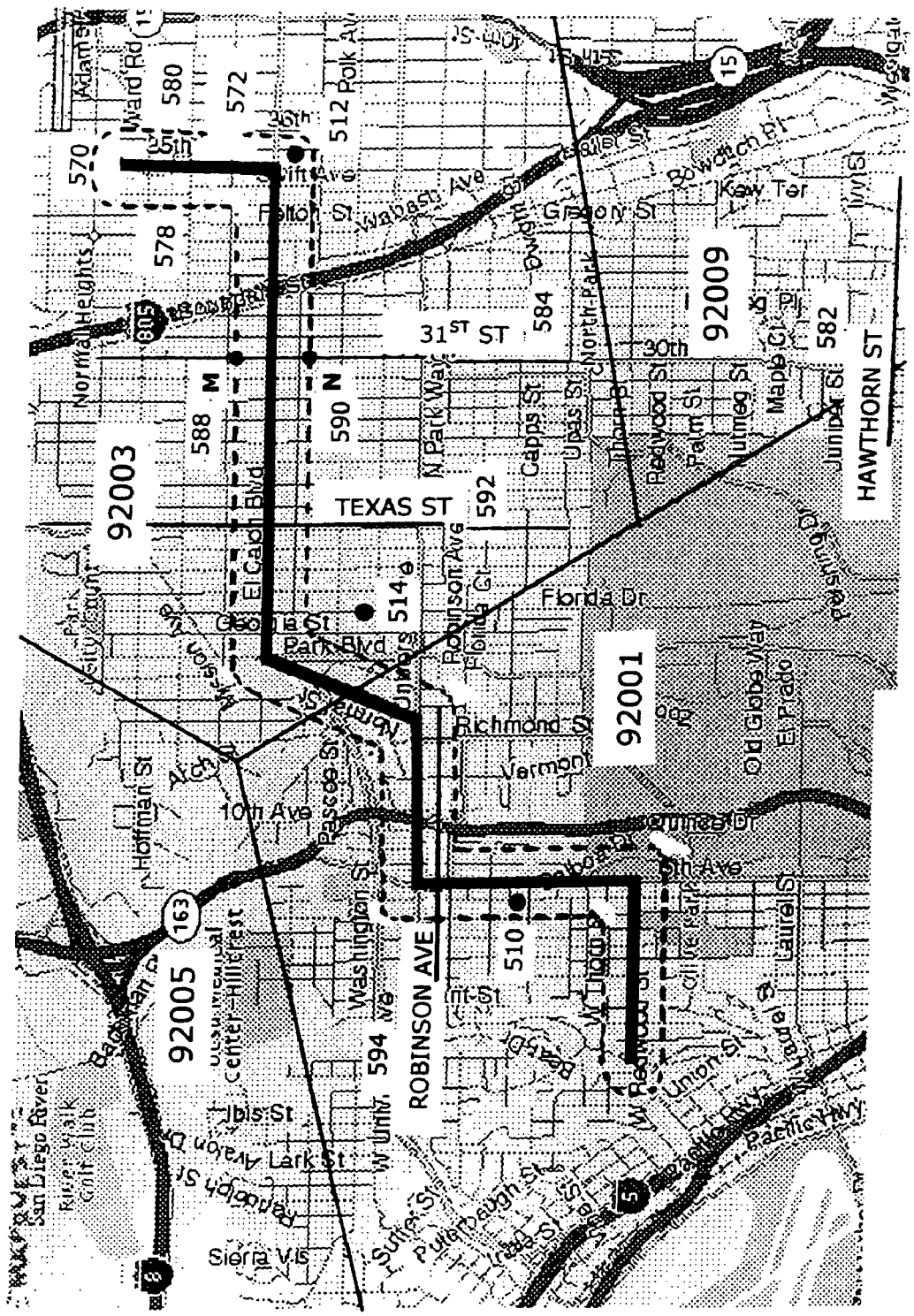
FIG. 7 shows the searching method by using user commuting route and user-selected channel.

Referring to FIG. 7, in one embodiment of a MPS server, a MPS server displays a map 500 that covers the beginning and end address of the buyer's chosen route. The buyer clicks or depress-and-drags the mouse across the map to define a chosen route 570. In another embodiment of the present invention, a buyer is prompted to enter a distance from the buyer's chosen route that the buyer is willing to travel to pickup a product. The distance a from the buyer's chosen route that the buyer is willing to travel is herein termed a channel width. The channel width is used by the MPS server to define channel boundaries 578 and 580 around the chosen route. This channel width combined with the buyer's chosen route creates a channel 572. The buyer may use this channel as a distance reference. Or the buyer may indicate to a MPS server that this channel width is the distance the buyer is willing to travel away from the buyer's commute route.

Alternatively, a buyer may enter the names of some or all the streets or highways the buyer travels to a MPS server, the MPS server will connect those streets or highways together with the shortest distance and further connect the buyer's beginning and end addresses to build a chosen route. The buyer may use the following procedures to click and build his chosen route on a map 500. The buyer starts with his beginning address, e.g. his home address, at this time the MPS server registers a reference point, which is the buyer's home address on the buyer's home street. The buyer then clicks on the map a second street the buyer will travel. The intersection of the second street and the buyer's home street become a second reference point.

The system registers the route between the first and the second reference points as a portion of buyer's chosen route. The buyer then clicks a third street the buyer will travel. The intersection of the second and the third street becomes a third reference point. The MPS server then registers the route between the second and the third reference points as a portion of the buyer's chosen route. The buyer keeps going on with the process until the buyer reaches the buyer's end address, which would be the buyer's final reference point. The MPS server registers a final route portion and the whole route may thus be identified as the buyer's chosen route.

Alternatively, the buyer starts a route selecting process by clicking a street in the middle of the buyer's commuting route, the buyer then has to click on the map the streets the buyer travels before and after the street to establish reference points for the MPS server to register as a portion of the buyer's chosen route.

The buyer chooses a channel width, e.g. ¼ mile. The MPS server displays two channel boundaries 578 and 580 that wrap around and extend along the chosen route 570 with the distance from a boundary to the chosen route equal to ¼ mile. The area between the channel boundaries defines a channel around the chosen route. The MPS server displays all available pickup points 510 and 512 covered by the channel.

If there is no pickup points within the channel, the MPS server then displays those pickup points around the channel such as point 514. The MPS server at this time may decide if the MPS server wants to relocate a pickup point to a place within the channel or the MPS server will wait till condition permits, e.g. more buyers use the same route, to establish an extra pickup point to serve the buyer. If the MPS server determines that no new pickup point should be established, the buyer selects a pickup point (e.g. 514) outside of the buyer's channel.

Referring again to the process flow diagram of FIG. 2, the buyer selects a width for the MPS server to develop a channel around a chosen route at step 123. The MPS server then displays a channel that wraps around and extends along the route at step 124 with the defined width.

The MPS server displays the channel as previously described in FIG. 7. The buyer uses the buyer's mouse to click a pickup point at step 128. The buyer can set the pickup point to be the buyer's default pickup point if the buyer desires at steps 130 and 132. The buyer also may enter the buyer's chosen pickup time at step 134. He may also set this pickup time as a default at steps 136 and 138. The server may set a station time as the time a MPS stays at the pickup point. For example, the MPS server may set station time between 4 p.m. to 7 p.m. or 6 a.m. to 9 a.m and the buyer comes between those times to pickup the buyer's products. If no station time is set, a MPS may stay at the pickup point until all scheduled buyers pickup their products.

The pickup time entry, in the case of no station time being set, gives the MPS server a planning tool as how long a MPS will stay at a pickup point before the MPS is sent to a next assignment.

On one embodiment of a MPS server, the pickup time entry may be also used as a guide to send a reminder to a buyer for pickups. For example, if a buyer enters 7:30 a.m. as the buyer's pickup time, the MPS server may send a reminder at 7:00 a.m. to the buyer to remind the buyer that the buyer has an order to pickup. The reminder may be very important if the order is to be picked up early in the morning. The reminder may be in the form of telephone calls to the buyer's office, home, or cellular phone. It may also be in the form of e-mails or messages sent to a buyer's palm pilot or it may be by other means permitted by technology.

Referring again to FIG. 1, after finishing input of all setup information, a buyer proceeds to step 140. The MPS server displays product categories for the buyer to choose if the buyer does not want to change any information at step 144. Product categories are different groups of products sold by a seller. For a food producing company (e.g. a food catering business or a lunch/dinner delivery business) the categories may be: drinks, wine, Italian food, French food, Japanese food, deserts, pizza or other products the server is selling. The MPS server may display only those categories that match the buyer's preference and disregard those that the buyer is not interested in purchasing. The buyer clicks on the category the buyer wants to purchase at step 146. The MPS server brings up all products under category buyer selected at step 148. The products displayed may be subject to the same screening process as previously described, which is, only products that match the buyer's preference are displayed and any other products are disregarded. The MPS server displays product features along with products. Those features displayed may be: ingredients, calorie counts, fat count, and price . . . etc. The MPS server may also employ newly developed technology that gives out the scent of the food when buyer reviews its product information to stimulate purchases. The buyer, after reviewing product items, decides to order and goes to order mode at step 150.

In one embodiment, a MPS server provides a Automatic Selection Method (ASM) service. This is a MPS server service designed for a buyer, who does not want to go through the trouble of ordering repeatedly and, after establish the buyer's preferences with the MPS server, want the MPS server to fill orders for the buyer according to the buyer's preferences. As an example, a buyer, who has set up a buyer's preference as follows: calorie under 600, fat under 30 grams, no red meat, no onion . . . etc, wants to use the MPS server to order food at step 152.

The MPS server follows the following steps to fill orders for him: The MPS server displays a calendar at step 154. The buyer marks on the calendar to indicate the days on the calendar the buyer wants to order products to be delivered at step 156. The buyer can choose to set different routes, pickup points and pickup time for each day on the calendar as described in steps 112-138 (FIG. 2). The buyer may use a default route, pickup point or pickup time information as previously entered in steps 158 and 160. The buyer can modify the buyer's preference if the buyer desires at step 162. The buyer may set up the "occurrence rate" for each product to appear on the buyer's menu at step 164. Occurrence rate is the percentage of times an item appears on the buyer's total orders.

Figure 8:
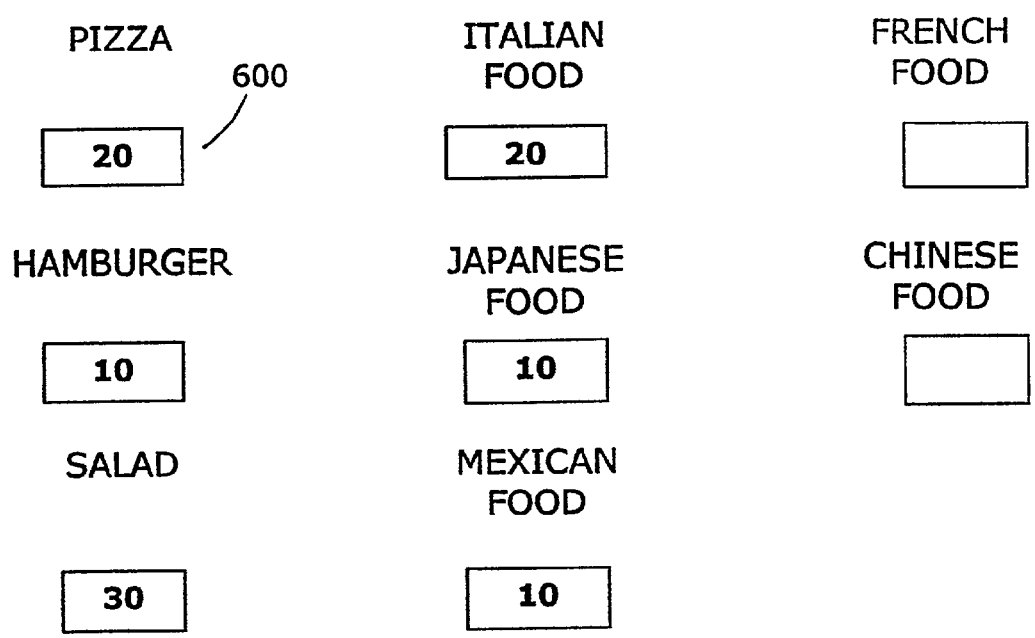
FIG. 8 shows user's input of occurrence frequency.

FIG. 8 is a sample template for a buyer to enter occurrence rates. An entry of a 20% occurrence rate for pizza 600 means the buyer wants 20% of the buyer's total orders to be pizza when the MPS server fills orders for him using ASM service. The MPS server can also be set up so that the same item will not appear twice consecutively.

Referring again to FIG. 1, the MPS server randomly fills orders for the buyer according to the buyer's preference and occurrence rate entered at step 166. If no change is to be made about the orders, the buyer then decides if the buyer wants to place orders in other categories at steps 168 and 170. If the buyer wants to place an order in another category, the buyer goes to category selection at step 146 and follows the same procedure as described before. If buyer does not want to shop for any other categories, the buyer makes payments at step 172.

The MPS server regularly checks buyer orders to see if there is any order or delivery that is due at step 174. If an order is due the MPS server prepares for production or makes inventory requisitions.

Referring again to FIG. 2, the MPS server collects buyer's names, pickup points, pickup times and other related information for due orders at step 176. The server first groups orders by buyer name at step 178. The MPS server may keep a total of all orders that have identical or nearby delivery addresses. The MPS server decides how physically close those addresses are to be qualified as "nearby". A delivery address is part of the information a buyer inputs when a buyer enters their preferences.

Delivery addresses are the addresses an MPS server will deliver products to, when the following circumstances occurs. The MPS server may decide that it is feasible for the MPS server to deliver products to a buyer at the buyer's physical address, (not deliver to a MPS pickup point for buyer to pickup, but deliver to the buyer's physical delivery address), if orders with the same or nearby delivery address are over a predetermined amount. Once the MPS server decides it is feasible to deliver, the MPS server sends a message to those related buyers notifying them that the products they ordered will be delivered to their delivery addresses. For buyers that agree to the delivery, the MPS server arranges the products to be delivered to them at their delivery addresses.

For those orders the MPS server does not deliver to a buyer's delivery address, the MPS server further groups those orders by pickup points at step 180. At this time, all orders are grouped by buyer name and by pickup point and are waiting to be shipped by MPS to MPS pickup points. The MPS server calculates the size of the load (orders) that need to be shipped to the MPS pickup point and assigns a MPS with enough capacity to execute the shipment at step 184. The MPS, after being loaded with orders, is dispatched to an assigned pickup point at step 186. The MPS server can determine the timing of dispatching MPSs to pickup points. For example, if a MPS is needed at a pickup point at 4:00 PM and MPS server also determines that the time spent on travel from the MPS server's warehouse to a MPS pickup point is about 1 hour, the MPS server determines that the MPS should leave the MPS warehouse at about 3 PM.

A MPS server may send out a reminder to a buyer to remind the buyer to pick up the buyer's products at step 188. The reminder may be sent by e-mail, a telephone call to a buyer's cellular phone or office, or by sending a message to the buyer's palm pilot. With a buyer who equiped with Mobile Location Determination System (MLDS), Global Positioning System (GPS) or car navigation system, the MPS server may, upon detecting that the buyer is near the buyer's pickup point, send a message to the buyer to remind the buyer to pick up products ordered and give the buyer the directions to the pickup point.

When a MPS arrives at a pickup point, the MPS stays there for the station time at step 190 and waits for buyers to pickup products at step 192. The MPS may install a sign, fly a balloon, or turn on a search light for buyer's easy identification. Also, a MPS may have microwave ovens for the buyer's convenience in heating up food the buyer picked up.

Figure 9:
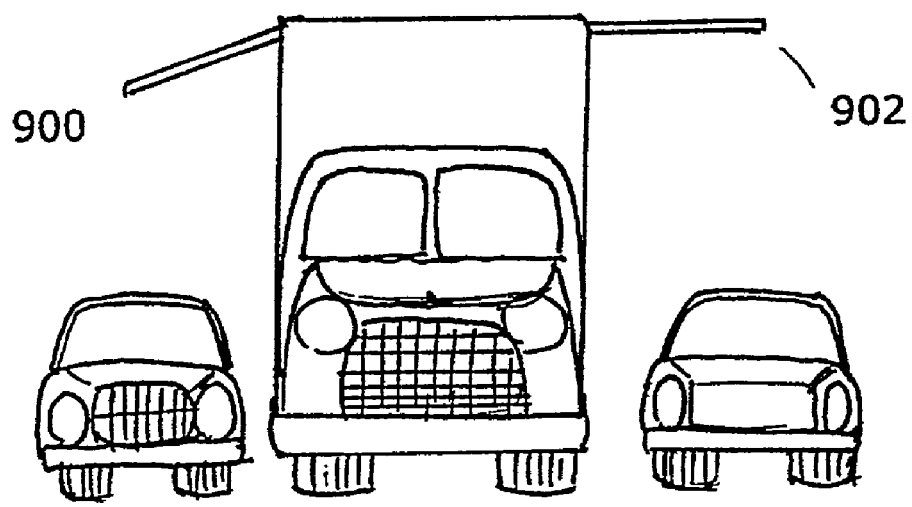
FIG. 9 shows a mobile pickup station with panel in an up position.

Referring to FIG. 9, a MPS may also install a panel 900. When the panel is pulled up to the panel's up position 902, the panel will shelter a buyer from the rain, snow or sunlight. When in the case the MPS is a truck, the panel provides the buyer a "drive-thru" lane. A buyer can thus pickup products ordered without leaving the buyer's car.

Referring again to FIG. 2, when a buyer picks up a product at step 192, the operator of a MPS may want the buyer to sign a receipt as evidence of receiving products. If buyer fails to pickup orders at step 194, the MPS operator may follow the buyer's instructions as how to handle those non-picked up products. A MPS server may give instructions such as: return those non-pickup products to a MPS warehouse for re-delivery or sell the non-picked up products for whatever the operator can sell and credit the buyer for the amount sold . . . etc. When the station time is up, the MPS leaves the MPS pickup point at step 196. For the maximum use of an MPS, it may be moved to another location to carry out other assignments at step 198.

If the buyer wants to order manually instead of using an ASM service to order at step 152, also if the delivery is not for the current day at step 153 and the selection of order is not complete at step 202, the MPS server provides a calendar at step 204 for the buyer to select the days of order/delivery desired. The buyer manually marks on calendar the days the buyer wants to order a product and have it delivered at step 206, and the buyer fills those days with an order at step 208. The buyer may specify a different route at step 210 and pickup time at step 212 for each day by using the same procedure as described before.

If the manual selection of orders is complete at step 202, the buyer makes decision as to whether the buyer wants to make other orders at step 170. If the buyer does want to make other orders, the buyer selects a category at step 146, if not, the buyer makes payments on the existing orders at step 172. If the buyer wants to order manually instead of using an ASM service at step 152, and if the order/delivery is for the current day at step 153, the buyer goes into the order mode and places an order at step 220. The buyer may change route, pickup point at step 224 and pickup time at step 226 as previously described.

As previously described, after a buyer establishes the buyer's chosen route and defines a channel width, a MPS server presents available pickup points within or around the buyer's channel for buyer's selection. Several different methods may be used by a MPS server to determine available pickup points for the buyer's selection.

An approximate method may be used when the MPS server does not have enough information about buyers' chosen commuting routes to establish a buyer route distribution within a region. The MPS server may then use traffic volume on a route (i.e. a highway or a street) as a guide to approximate buyer route concentrations and place available pickup points along the route for buyer selection. A highly traveled highway may be assumed to have a high route concentration. The same assumption may be made for a busy major street. The MPS server may thus present pickup points along those routes. Other criteria in determining available pickup points may be considered and will be disclosed later.

Figure 3:
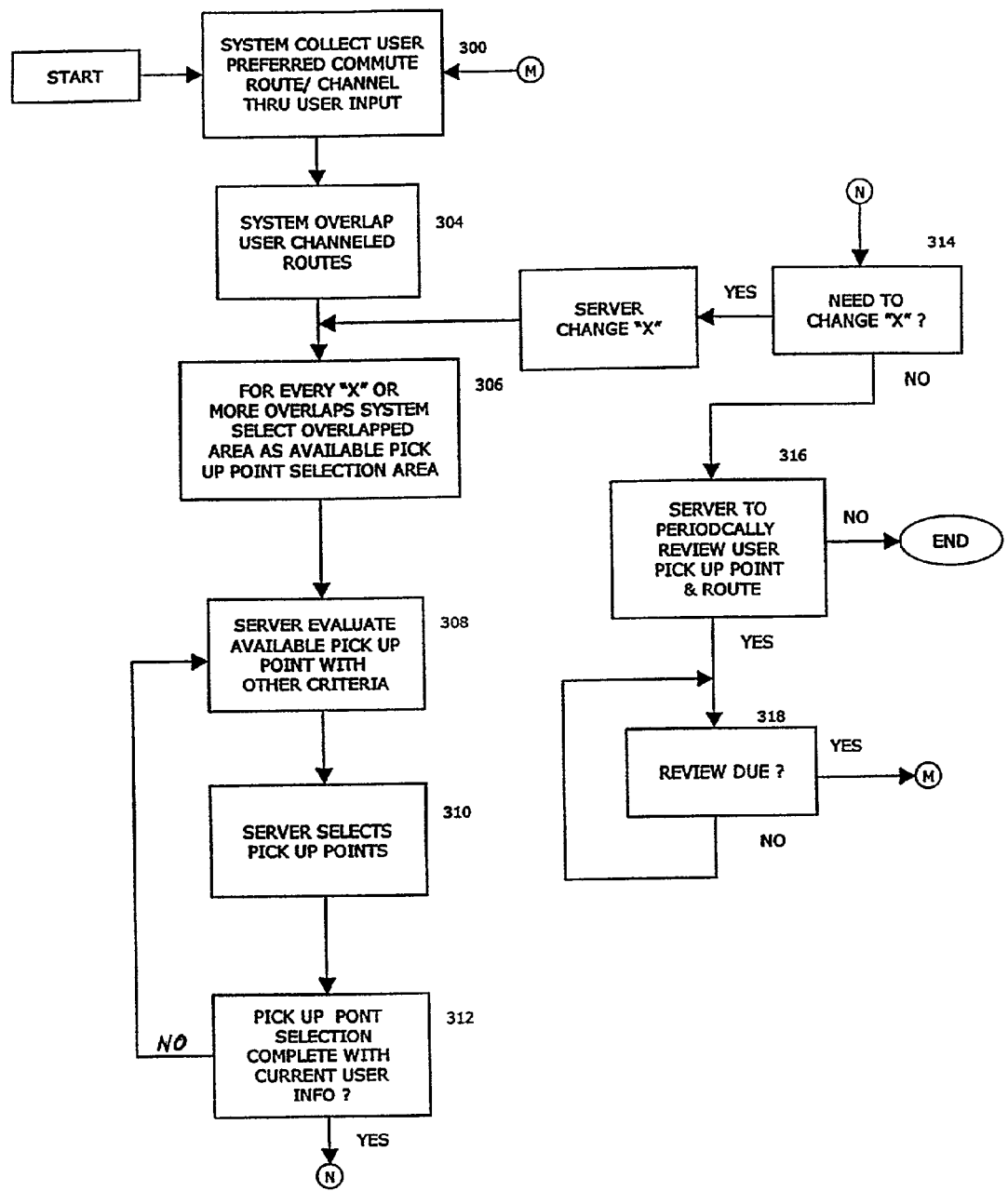
FIG. 3 is a flowchart showing an exemplary process to select available pickup points.

FIG. 3 is a process flow diagram of a method used by a MPS server for selecting available pickup points using an overlap route method. In this method, the MPS server collects buyer chosen commute routes and channels from buyer input at step 300. The MPS server then overlaps all channeled chosen routes defined by all buyers at step 304. The MPS server may for every overlapped area select the overlapped area as an area for available pickup points at step 306. In addition to overlapping, the MPS server may consider other criteria at step 308. Other criteria the MPS server might consider are: is rent involved for using a pickup point? How much is the rent? Is the pickup point far away from the buyer's route? Is the pickup point convenient to get access to from a buyer's route? Is parking sufficient? Is the pickup point easy to identify . . . etc. The MPS server makes a decision and selects available pickup points at step 310.

A buyer chooses a buyer's chosen pickup point and/or default pickup point among those available pickup points provided by the MPS server. If the MPS server needs to provide more pickup points to the buyer, the MPS server goes to step 308 for more selections. The MPS server may change parameters to expand or contract the area of available pickup points at step 314. From time to time, the MPS server may periodically review buyers' chosen commuting routes at step 316 to see if buyer route distributions have changed. If buyer route distributions have changed, the MPS server can correspondingly reposition its pickup points to better serve buyers. If the time for route reviewing is due at step 318, the MPS server starts the whole process all over to update the MPS pickup point positioning at step 300.

Figure 10:
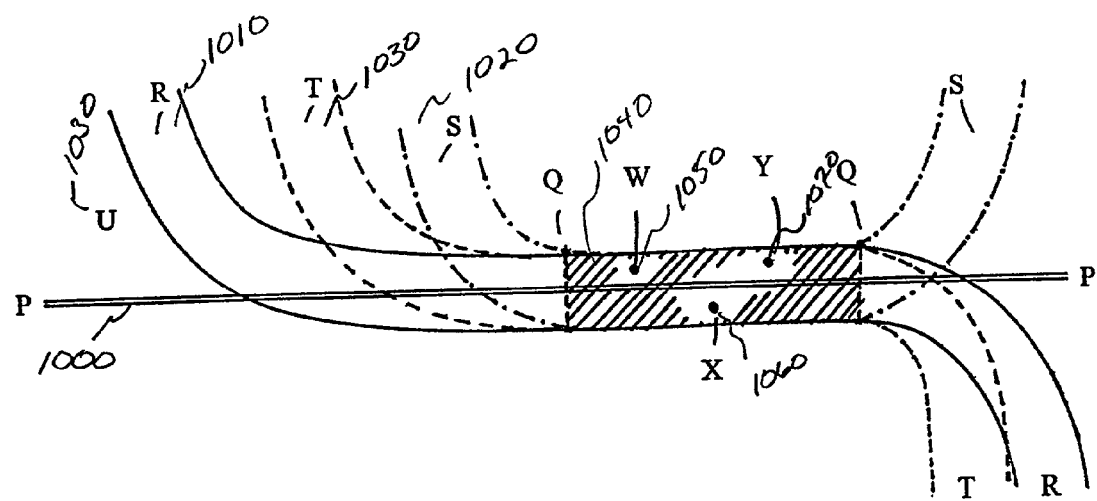
FIG. 10 shows the overlapping of user channels and server's selection of available pickup points.

FIG. 10 is a graphical representation of a MPS pickup point area assessment. Assume that PP 1000 is a route, e.g. a highway or a major street with heavy traffic. Buyers R, S, and T each have a buyer's chosen route. Buyer R has chosen route RR 1010, buyer S has chosen route SS 1020, and buyer T has chosen route TT 1030. Also assume that in the beginning, a MPS server does not have any route information pertaining to buyers R, S, an T. the MPS server can only use an approximate method to choose a pickup point, for example, point U 1030. Under this method, buyers R, S, and T have to travel out of their chosen channels to get access to point U.

Now assuming the buyer routes are available to the MPS server. The MPS server overlap all chosen channels from for all of the buyers to form an overlapped area QQ 1040. Area QQ will be qualified as a pickup point selection area, because QQ is the area overlapped by multiple chosen routes, namely, RR, SS and TT. The MPS server may propose pickup points within this available pickup point selection area QQ to a buyer wishing to pickup a product.

Now assume that points W 1050, X 1060, and Y 1070 are locations inside area QQ that the MPS server considers as possible pickup points. Also assume that point W is a parking lot in a major super market, W is also close to route PP and easily accessed from route PP. The MPS server selects W to be a pickup point after the MPS server considers all criteria. Point W is then presented to buyers R, S and T and W can be chosen as a pickup point. A buyer may then abandon their original pickup point U and position the new pickup point at W. The MPS server may propose more than one available pickup point in an available pickup point selection area depending upon buyer route concentration, e.g. X or Y may be selected as available pickup points also if the MPS server desires.

In another embodiment of the present invention, a MPS server acts as a third party delivery MPS server. A third party is a business entity other than the entity providing the MPS server itself that has an agreement with a MPS server to use a MPS server services to serve the third party's customer. For example, a local flower shop may receive orders on line from a buyer. The flower shop allows the buyer to access a MPS server operated by an entity other than the flower shop so that the buyer can use the MPS server to position a pickup point and pickup flowers ordered there. This flower shop is a third party seller.

Sometimes a third party seller's customer may already have a preferred MPS pickup point established with a MPS server because of previous orders with other companies. In this case, the third party seller only needs to confirm that the buyer wants to use the MPS service to pickup flowers ordered, the flower shop then makes arrangements with the MPS server so that the flower ordered may reach the pickup point for the buyer to pickup. The arrangements between the third party seller and a MPS server with regards to the shipment of products from the third party seller to a MPS warehouse may take many forms and will be discussed in more detail later.

Upon receipt of the third party's products, a MPS server searches to see if the buyer has other orders that can also use MPS service. If the buyer does have other orders, the MPS service groups all orders pertaining to the same buyer and uses a single MPS to deliver those products to a MPS pickup point for pickup by the buyer.

Figure 4:
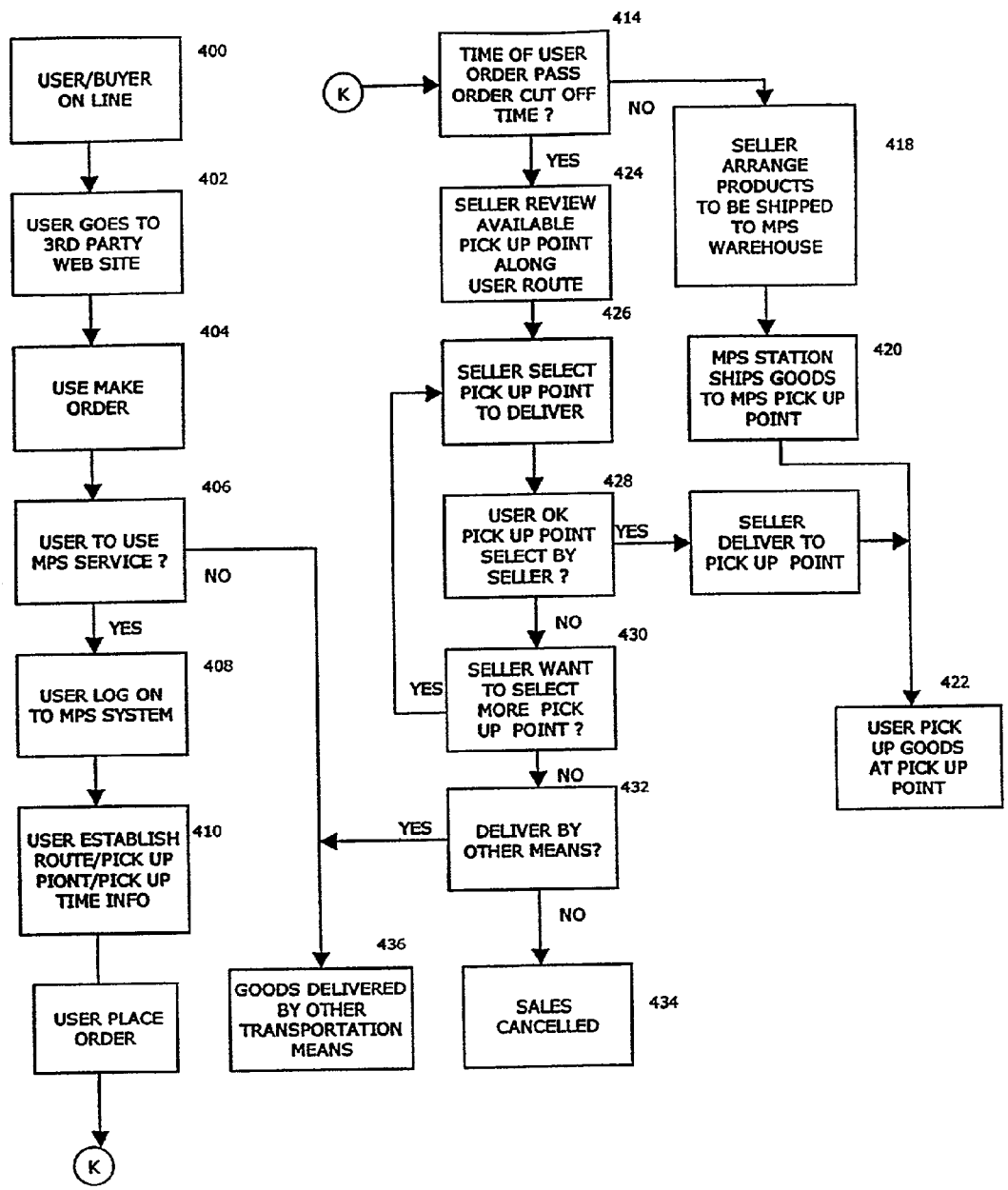
FIG. 4 is a flowchart showing third party buying coupling with a mobile pickup station delivery service.

FIG. 4 is a process flow diagram of a third party seller ordering process. A buyer goes on to the Internet at step 400, and goes to a third party's Web site at step 402. The buyer makes orders at step 404, the buyer then makes decision as to what delivery options the buyer will use at step 406. The buyer decides if the buyer wants to use conventional delivery methods to ship the buyer's order, which usually involves shipment by common carriers (e.g. by UPS or US Post Office), or uses MPS pickup MPS server so that the buyer can pickup the buyer's order at a pickup point. Assuming the buyer wants to use a MPS service, the buyer goes to a MPS server Web site at step 408.

At the MPS server Web site, the buyer either sets up to establish a pickup route and pickup point with the MPS server or updates route and pickup point information already established with the MPS server from previous purchase with the MPS server at step 410. The third party seller keeps a record of the buyer's order together with all related shipping information.

The third party seller may establish an order cut off time, which is the latest time for order receiving. An effective cut off time allows the seller enough time to pack and arrange ordered products to be shipped to a MPS warehouse before a MPS server dispatches to MPSs to pickup points. For example, assume a MPS leaves a MPS warehouse the heading for a MPS pickup point at 3:30 PM. Also assume that it takes 30 minutes for the seller to process and pack orders and it takes another 30 minutes for the products to be shipped to the MPS warehouse, the order cut off time will be set at 2:30 PM. If a buyer orders before cut off time at step 414, the third party seller then arranges the ordered products to be shipped to the MPS warehouse at 418.

There are various ways products can be shipped to a MPS warehouse, which will be disclosed later. Once ordered products are shipped to a MPS warehouse, the products are loaded on to a MPS and then the MPS moves to a MPS pickup point at step 420 and waits for buyers to pickup up products at step 422.

In the case where a buyer orders after the cut off time of 2:30 PM, as set in the above example, the third party seller may impose an extra delivery fee to deliver the order to a preferred pickup point and the buyer can pickup the buyer's order at that pickup point. In this case, the third party seller logs on to a MPS server. The MPS server displays a map that covers the third party seller's location and the buyer's route at step 424. The MPS server also displays the buyer's default pickup point and other available pickup points near the route. The seller selects a pickup point for delivery at step 426 and quotes the buyer the price of delivery to that pickup point. If buyer agrees with the quotation and other terms at step 428, the products are delivered to that specified pickup point for buyer to pickup at step 422. If no pickup point is satisfactory to the buyer, other arrangements have to be made at step 436 or the sale is cancelled at step 434.

As previously discussed when discussing step 418 of FIG. 4, various arrangements for the shipment of products from a third party seller's store to a MPS warehouse may be made. These arrangements may take many forms.

Figure 11:
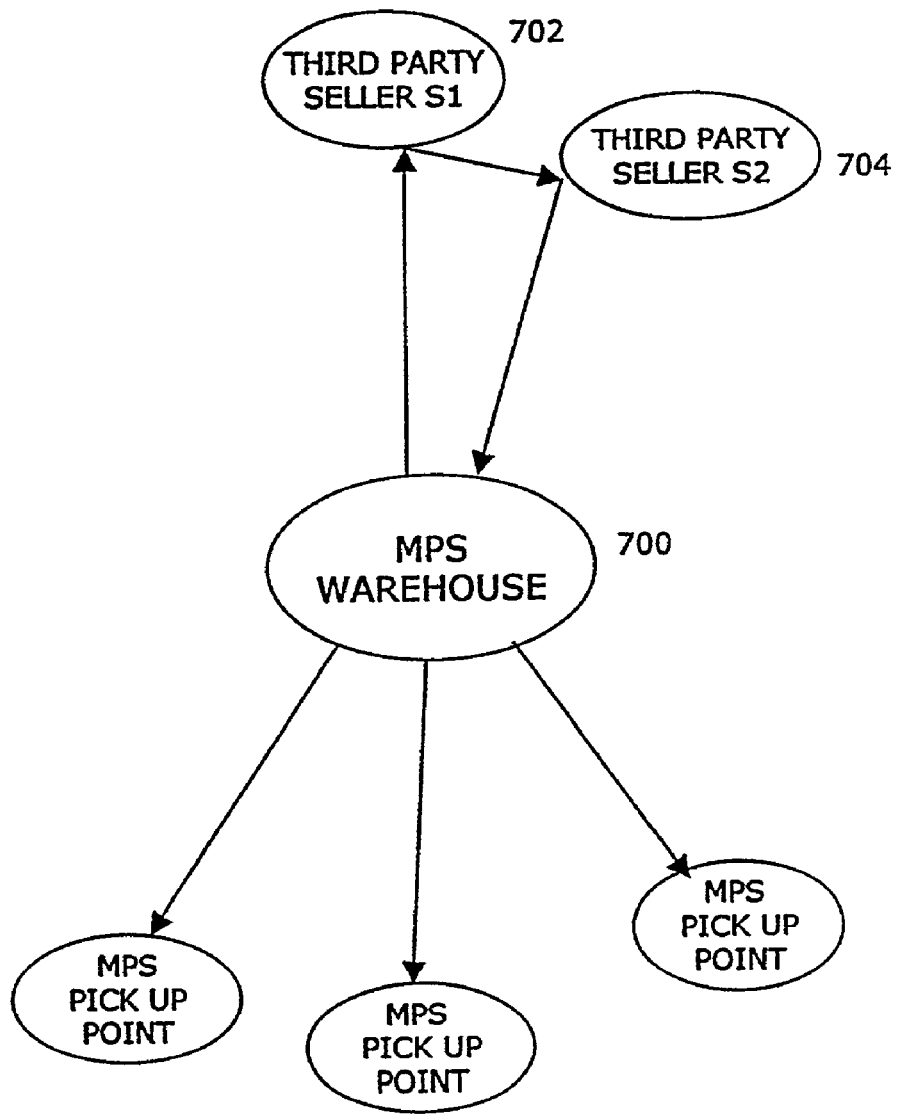
FIG. 11 shows a first model of the arrangement of shipping third party products to a mobile pickup station warehouse.

In one embodiment of a MPS server, as illustrated in FIG. 11, a MPS warehouse 700 sends out transportation equipment, e.g. MPSs, to the warehouses of a third party seller S1 702 and a third party seller S2 704 to pick up products ordered by buyers. The MPSs then go back to the MPS warehouse for packing and distribution or goe directly back to the appropriate pickup points.

Figure 12:
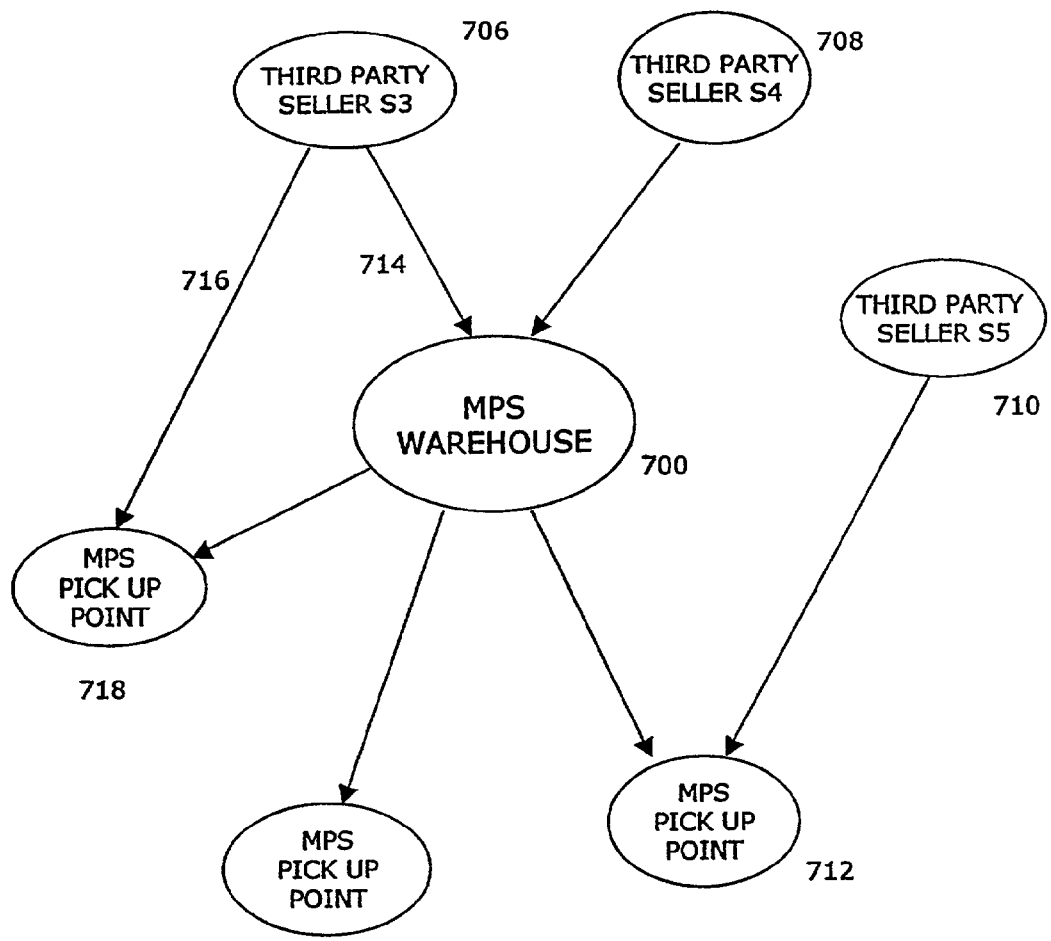
FIG. 12 shows a second model of the arrangement of shipping third party products to a mobile pickup station warehouse.

In an alternative embodiment of a MPS server, as illustrated in FIG. 12, a third party seller S3 706 and a third party seller S4 708 ship buyer ordered products to a MPS warehouse 700 by their own transportation means. S5 710, another third party seller, which is local to one of the pickup points 712, may choose to ship buyer ordered products directly to the pickup point 712. A MPS that stays at pickup point 712 receives the products and waits for a buyer to pickup the products. Third party seller S3 may use route 716 to deliver a portion of orders directly to a pickup station 718 and at the same time deliver another portion of orders to the MPS warehouse 700.

Figure 13:
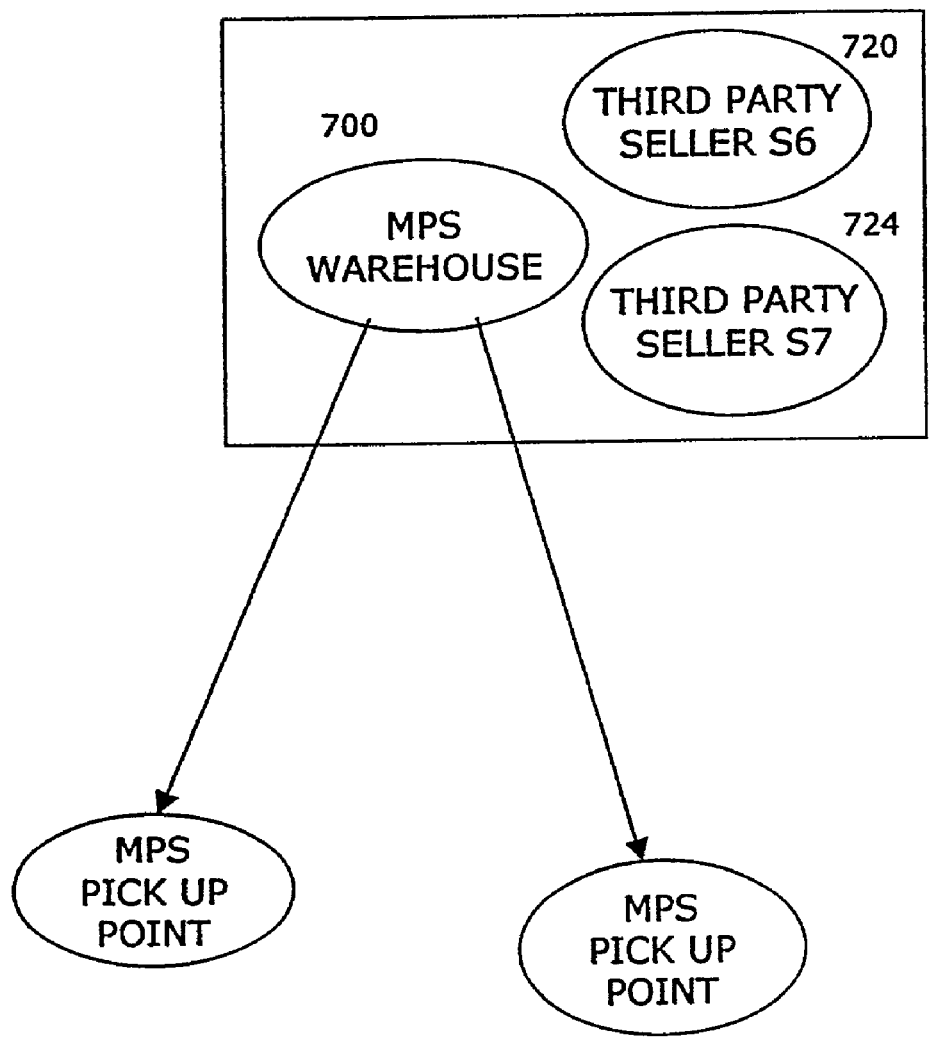
FIG. 13 shows a third model of the arrangement of shipping third party products to a mobile pickup station warehouse.

In another alternative embodiment of a MPS server, as illustrated in FIG. 13, third party seller S6 720 and third party seller S7 724 can be at the same location with a MPS warehouse 700. The third party sellers may be different entities that share the same warehouse or they may be different divisions that belong to the same entity. In this model, because the third party sellers are so closely located to each other, the order cut off time can be close to the time MPSs are dispatched to pickup points.

Figure 14:
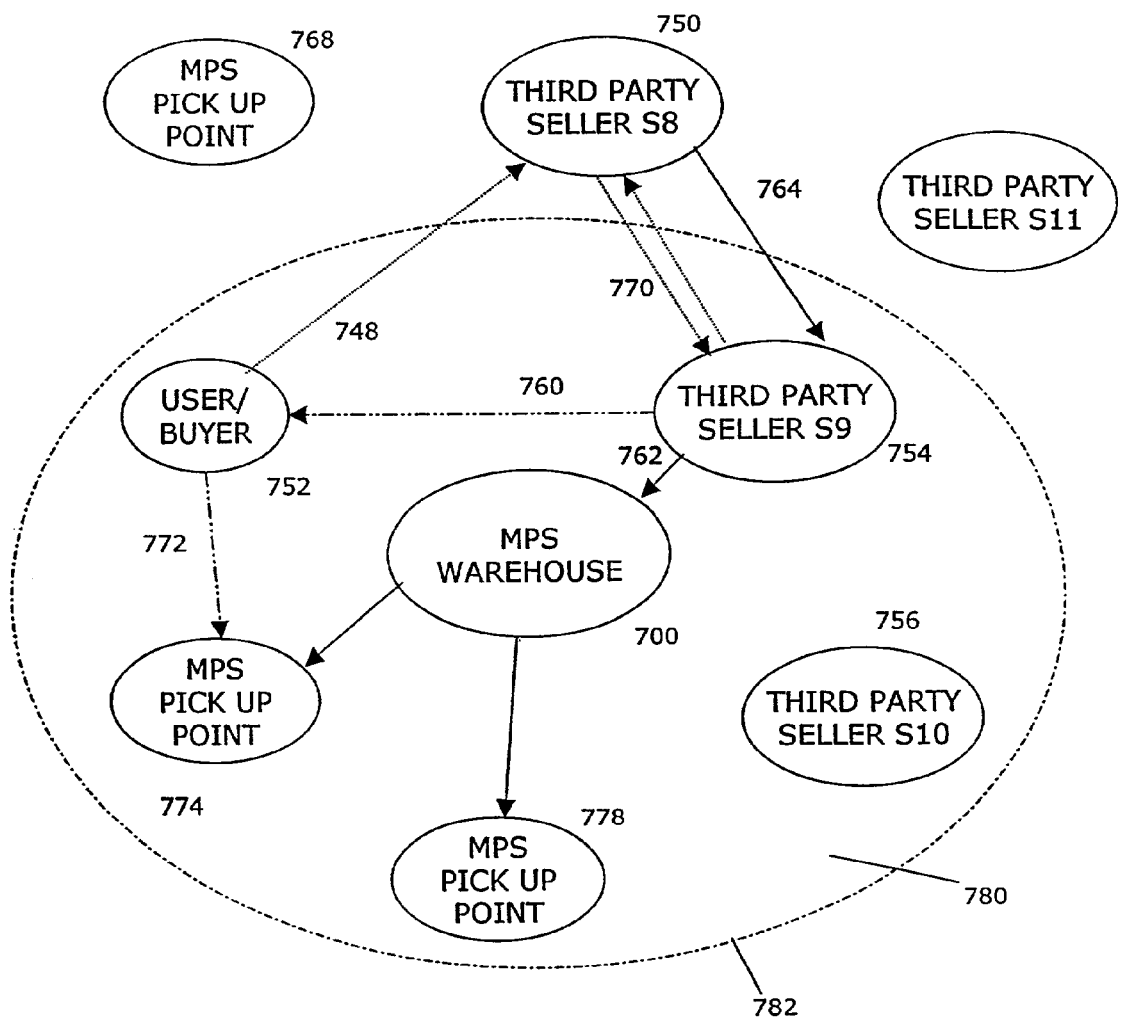
FIG. 14 shows a fourth model of the arrangement of shipping third party products to mobile pickup station warehouse.

In another alternative embodiment of a MPS server, as illustrated in FIG. 14, third party sellers loan each other products to ease short term deficiencies in product supplies at a buyer's location. Assume that a third party seller S8 750 is a distant third party seller away from a MPS warehouse 700. A distant seller is a seller that is located far away from a MPS warehouse that serves a buyer. A seller S8 750 receives an order from a buyer 752 via the Internet or by other means 748. Assuming a third party seller S9 754 and a third party seller S10 756 are affiliates to S8 and each has an inventory loan agreement with S8. Third party sellers S9 and S10 may be related or unrelated business entities, or strategic partners to third party seller S8. Or third party sellers S9 and S10 may simply be warehouses owned by and apart from S8. For the purpose of this case, third party sellers S9 and S10 may be any kind of entities as long as third party sellers S9 and S10 have inventory loan agreements with third party seller S8.

In this case, third party seller S8 receives an order from a buyer and contacts third party sellers S9 and S10 to see if third party sellers S9 and S10 carry the same products as the products the buyer ordered. Third party seller S8 finds third party sellers S9 and S10 by using a search method called "Territory Search Method" to be described. Third party seller S8 then checks to see if third party sellers S9 or S10 can loan the item to third party seller S8 by shipping to the buyer the identical products the buyer orders. If both third party sellers S9 and S10 carry the ordered products, third party seller S8 proceeds with the loan transaction arrangement with the third party seller who would charge third party seller S8 the least.

For example, if third party seller S9 is willing to proceed with a loaner transaction with third party seller S8, third party seller S9 ships a product the buyer ordered to the buyer's previously described delivery address or to the buyer's previously described preferred MPS pickup point based on the shipment method the buyer prefers. At this point third party seller S8 owes an identical product to third party seller S9. To perfect and secure the transaction to be an inventory loan transaction between third party sellers S8 and S9, agreements 770 between third party sellers S8 and S9 should be maintained. Such agreements may include provisions such as: third party seller S9 will be paid back by receiving the identical products from third party seller S8 only; third party seller S9 is paid a processing fee for the loan arrangement; third party seller S9 will not be paid for the products loaned by money; third party seller S9 does not receive any exchange for other products from third party seller S8; third party seller S9 will ship products to the buyer only after third party seller S9 receives a confirmation from third party seller S8 stating that identical products have been shipped to third party seller S9; and third party seller S8 is the party solely responsible for the quality of products shipped and any related customer-seller dispute will be resolved between third party seller S8 and the buyer. In a product loan transaction, third party seller S9 never sells any products and keeps the same amount of inventory on the buyer's book. In reality, the buyer may not even realize that third party seller S9 exists. Any legal arrangements that may deal with title, risk, responsibility, insurance or others, as long as it will make this transaction a sale between the buyer and third party seller S8 and not a sale between the buyer and third party seller S9 will be instituted.

After third party seller S8 750 receives an order 748 from the buyer 752, and after the third party seller S8 and the third party seller S9 754 have secured an inventory loan agreement 770, third party seller S9 ships the products ordered to the buyer. Third party seller S9 may ship directly to the buyer address by common carrier 760, or by a MPS server 762. Third party seller S8 returns 764 the products loaned to third party seller S9. Assuming the buyer wants to use a MPS service, the buyer picks up the order at MPS pickup point 774.

Of course, as long as both parties agree, third party seller S8 may pay off third party seller S9 for the products loaned by paying money rather than delivering an identical product to S9. Such a payment, however, may cause third party seller S9 to recognize a sale. Also, if third party seller S9 is a distant warehouse and owned by third party seller S8, third party seller S8 may instruct third party seller S9 to ship products the buyer ordered (either to the buyer by common carriers or by a MPS service) without an inventory loan agreement. In this case, third party seller S9 may have to recognize a sale with the buyer especially with interstate transactions.

One embodiment of a MPS server provides for a channeled route search method in which the MPS server utilizes the commuting route and channel building technique previously described to carry out searches for products buyer wants to purchase. For example, a buyer wants to buy a car battery, the buyer goes to the Internet and logs on to a MPS server in search mode. The MPS server displays a map. A buyer may click or depress and drag the buyer's mouse on the map to define a route. The buyer may further define a width of a channel to form a channeled route and search within this channel for stores that carry the products the buyer wants to purchase.

Referring again to FIG. 7, the buyer through clicks or drag of mouse define route 570. Assuming the buyer wants to search for a store with ¼-mile distance along the buyer's commuting route, the use sets a channel width size of ¼ mile. The MPS server displays a channel 572 with boundaries 578, 580. Each boundary is ¼ mile apart from the route 570. The MPS server will later search to see if there are any stores within the channel that carry the product the buyer wants. The MPS server accesses a database that contains stores with information such as: name, products carries, product price, address (with zip code) and telephone number . . . etc.

The MPS server first determines all the Zip Codes that are covered by the channel. A zip code is covered by the channel as long as any portion of the zip code area is within the channel. For example, zip codes 92001 and 92003 are covered by channel 572. Zip code 92005 and 92009 are not. The MPS server goes to a database to search for all stores that carry car batteries and also with zip codes 92001 or 92003. All the car battery carrying stores with zip codes 92001 or 92003 are selected for the next test, and those stores with other zip codes, e.g. 92005 or 92009, are disregarded. If no stores are found in this search, the buyer may change the width of channel or change the buyer's selected route to launch another search. If there are stores that carry car batteries with channel matching zip codes (i.e. with zip codes that match 92001 or 92003), the MPS server saves these stores in memory and goes to the next step.

The MPS server searches for all the street names covered by (or within) the channel. Any street name or avenue name is covered by (or within) the channel as long as any portion of the street or avenue is inside the channel. For example, the channel covers Texas Street 592 and also Robinson Ave 594. MPS server compares all the street names within this channel to the street name of those stores with matching zip codes selected from above step. At this stage, all car battery carrying stores, with matching zip codes and with street names matching any of the street names within the channel are selected for the next test and the others are disregarded. For example, after the zip code test, all stores with street names such as "Hawthorn Street" 582 are disregarded and all stores with street names such as "The 31st Street" 584, Texas Street 592 or Robinson Ave 594 are selected for the next test. This is because Hawthorn Street in not covered by the channel and 31st Street and Texas Street are. Again, if there is no match found, the buyer can either enlarge the width of channel or change the buyer's commute route to launch another search.

If there are stores that match the above tests, the MPS server goes to the next step. The MPS server, after the buyer defines the width of the channel, can determine the street numbers (or street addresses, as sometimes called by people) at the boundaries of the channel. That is, the MPS server can determine the street numbers of points such as M 588 and N 590. The MPS server, then determines if those matching stores from the above steps have a street number that falls between the boundary points such as M and N. If the store does have a street number that falls between boundary points like M and N, the store is selected and is presented to the buyer, if not, the store is screened out and disregarded. For example, suppose the MPS server determines the address number of M 588 is 2002 $31^{st}$ Street and the address number of N 590 is 1800 $31^{st}$ Street, a store with street address number 1900 $31^{st}$ Street will be selected and a store with address 2300 $31^{st}$ Street is disregarded. If no store is selected, the buyer can modify channel width and commute route to perform another search. After the buyer finds those stores that carry products the buyer wants to but by using this search method, the buyer can go to the store's web site and place order. The buyer then decides whether the buyer wants to use a MPS service for pickup. If the buyer wants to, the MPS server goes to step 406 (FIG. 4) and continues the procedures as described previously.

Figure 15:
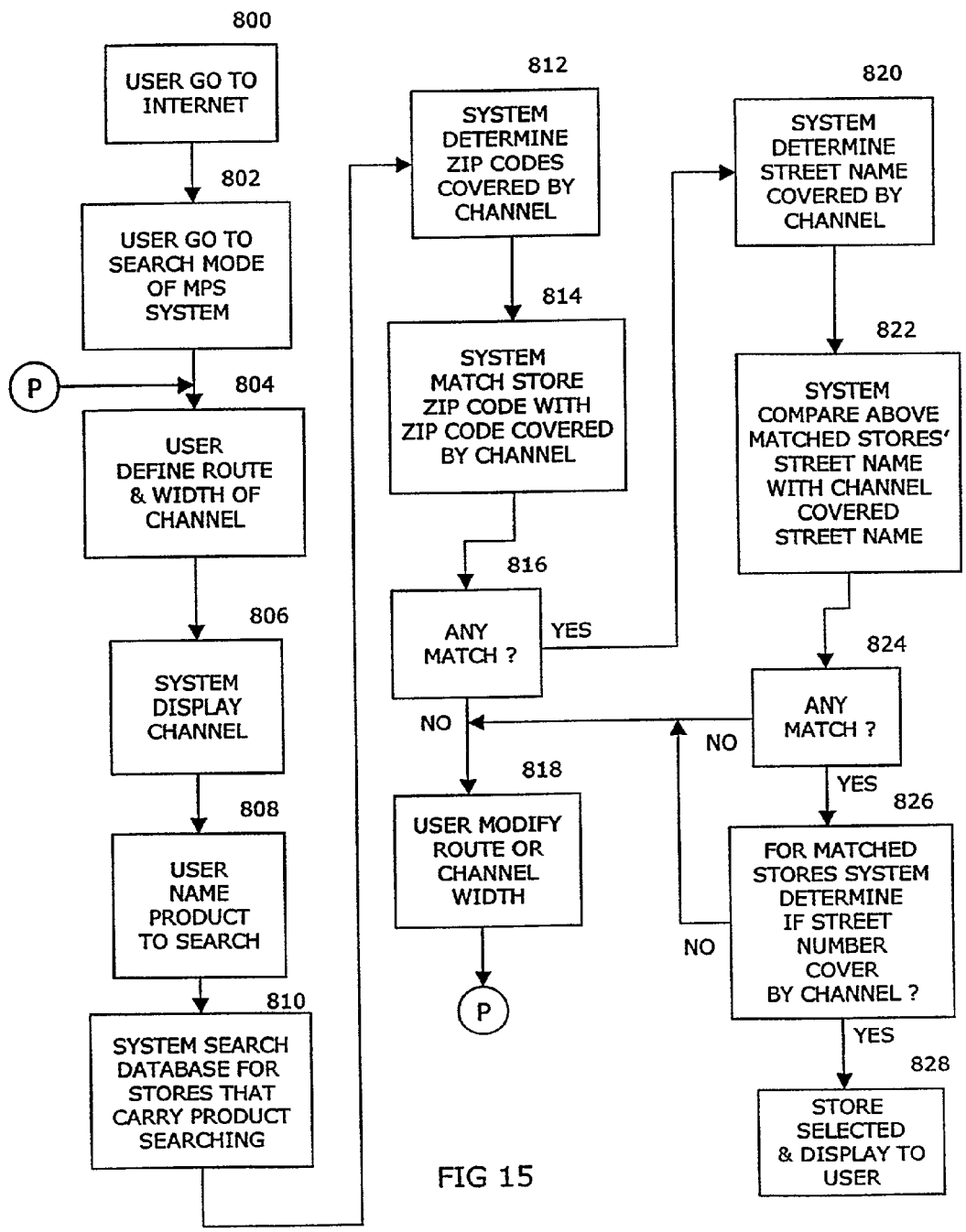
FIG. 15 is a flowchart presentation of the searching method by using user-commuting route and user selected channel.

FIG. 15 is a flowchart presentation of the above search method. A buyer uses a Web browser to access a MPS server at step 800. The buyer enters a channel search mode at step 802. The buyer defines a route and a channel as previously described in step 804. The MPS server displays the channel to the buyer at step 806. The user selects a product to search for at step 808. The MPS server searches a store database for stores carrying the searched for product at step 810. The MPS server determines channel Zip codes covered by the channel as previously described at step 812. The MPS server matches the channel Zip codes found in step 812 to store Zip codes of stores found in step 810. The MPS server determines if any store Zip codes matched any channel Zip codes at step 816. If no matches were found, the buyer is invited to modify the search parameters at step 818.

If the MPS server determines that there are matches between the channel Zip codes and the store Zip codes, the MPS server determines the street names covered by the channel in step 820. The MPS server matches store street names to channel street names to determine if a store might fall within the channel at step 822. If there are no matching store street names and channel street names, the buyer is invited to redefine the search parameters at step 818.

If the MPS server determines that there are matches between the channel street names and the store street names, at step 826 the MPS server determines if a store street number is within the channel boundaries as previously described. If there is a store street number within the channel boundaries, the MPS server displays the store to the buyer at step 828. If there are no store numbers within the channel boundaries then the MPS server invites the buyer to redefine the search parameters at step 818.

In one embodiment of a MPS server, the MPS server allows a third party seller to search for another third party seller within a specified territory. Referring again to FIG. 14, third party seller S8 750 uses a MPS server to locate affiliated third party sellers S9 754 and S10 756 that are within a territory 780 of a MPS warehouse 700 that serves a buyer's 752 preferred pickup point 774. The MPS server may operate on a territorial basis, i.e. a MPS warehouse may be assigned a regional territory 780 and serve a number of pickup points 774 and 778 that are within its territory while other MPS warehouses may cover and serve other pickup points 768 within the other MPS warehouses respective territories.

When the buyer places an order with third party seller S8 and the buyer wants to use MPS services, the buyer tells third party seller S8 a pickup point ID number that is assigned and used to identify the buyer's preferred pickup point. Third party seller S8 then transmit the buyer's pickup point number along with all the addresses of its affiliates to the MPS server. The MPS server uses the transmitted buyer pickup point number to identify the MPS warehouse that serves the buyer's preferred pickup point.

In this embodiment of a MPS server, every MPS warehouse is assigned a territory. A MPS server's territory is determined by a MPS server according to criteria such as: number of buyers served, buyers' demographic distributions, distances a MPS has to travel, time a MPS spends when traveling to MPS pickup points . . . etc. Every territory, e.g. 780, has its boundary, e.g. 782, and may be in different shapes as needed, e.g. it may be in the shape of rectangular, circle or other irregular shapes. Each point on the boundary has a known distance and relative direction to MPS warehouse, therefore the street address of each point on the boundary can be determined.

The MPS server then determines the zip codes and street names that are covered by the territory using the same method as previously described in the channeled route search method along with the affiliates' addresses provided by the third party seller S8, the MPS server may be able to identify those affiliates that are within the territory of the MPS warehouse which serves the buyer's pickup point. Using the same procedures as used in the channeled route search method, the MPS server first screens out those affiliates with zip codes not covered within the territory. The MPS server then screens out those affiliates with street names not covered by the territory. Finally, by establishing the addresses at the boundary, the MPS server may determine those affiliates with addresses that are covered by the MPS warehouse territory. The MPS server then presents these affiliates to the third party seller S8 for selection.

In one embodiment of a MPS server, a buyer specifies another party to pickup the buyer's products. The buyer uses a MPS server to modify the pickup point to be a place where a picking up person prefers. The buyer can also specify the name of the picking up person and request that a MPS operator check the ID of the person who picks up the product to ensure proper pickup. In the case where the MPS server is operated by an entity that engages in the business of delivery or transportation, the service that MPS server provides is the transport of the buyer's product or packages to a pickup point the picking up person desires and waits for the picking up person to pickup.

In one embodiment of a MPS, the MPS may contain lockers that may vary in size, with each locker containing products ordered by a buyer. The lockers are accessed using an entry code assigned temporarily to the locker and given to a buyer. When the MPS server loads the MPS with products buyers ordered, the MPS is transported to a pick up point. A buyer, after completing his order, receives a locker identifier and access code to open the locker. The buyer goes to the pick up point where the MPS is positioned, and uses the access code to open the locker to receive the product ordered.

In one embodiment, the MPS takes the form of a kiosk which may be secured to the ground or a wall by a lock so that it can not be moved easily. In this way, it may not be necessary for an operator to attend to the kiosk during operation.

In one embodiment of a MPS server, Fixed Pickup Stations (FPSs) are established within a territory established by a MPS server. For example, there may be stores, e.g. gasoline stations, convenience stores or super markets . . . etc, that are located within the previously described available pickup points selection area. The MPS server may wish to contract with these stores to be pickup stations for MPS buyers. If a store agrees and an agreement is reached by the entity operating a MPS server and the store operators, the store becomes a FPS and will be one of the pickup points that are available for MPS buyers to select as pickup points. The MPS server then arranges for products ordered by buyers to be shipped to the FPS. Each FPS station may be used as a pickup point as well as a drop off point, the same way as a regular MPS.

In one embodiment of a FPS according to the present invention, the FPS can be provided with lockers. In this case, the FPS lockers are filled products ordered by buyers. The FPS is equipped with a computer that will change the code of each locker according to a schedule.

A MPS can be a receiving station as well as a drop off station. A drop off station is a station where a user submits to MPS personnel packages the user wants the MPS service to ship to a receiver. The MPS server, after receiving packages dropped off from the user ships the packages back to a MPS warehouse for distribution. After distribution, the packages may be shipped to a MPS pickup point that is convenient to the receiver's commuting route, or shipped by other means, such as shipped by a common carrier, e.g. UPS, for delivery to a receiver. In the case where a MPS server is a delivery or transportation business entity, such as FedEx, a MPS can be used as a pickup station for those designated receivers to pickup their packages. A MPS can also be used as a drop off station for those users to drop the packages they want the MPS server to ship to the packages receivers. Again, after a MPS receives such packages from the user, the MPS will ship the packages back to a MPS warehouse for distribution.

Having thus described several exemplary implementations of the invention, it will be apparent that various alterations and modifications can be made without departing from the inventions or the concepts discussed the herein. Such operations and modifications, though not expressly described above, are nonetheless intended and implied to be within the spirit and the scope of the inventions. Accordingly, the foregoing description is intended to be illustrative only.

What is claimed is:

1. A method for scheduling and delivery of a product to a buyer along a commuting route, comprising:
   receiving an order of a product from a buyer by a seller;
   receiving commuting route information from the buyer by a server, the commuting route information including a beginning address and an ending address;
   identifying a commuting route of the buyer comprising selecting at least one commuting route parameter and calculating by the server the commuting route based on the commuting route parameter, the commuting route connecting the beginning address and the ending address;
   receiving commuting route information from a second buyer of the seller by the server, the second buyer commuting route information including a second buyer beginning address and a second buyer ending address;
   identifying a commuting route of the second buyer comprising selecting at least one second buyer commuting route parameter and calculating for the second buyer by the server a second buyer commuting route based on the second buyer commuting route parameter, the second buyer commuting route connecting the second buyer beginning address and the second buyer ending address;
   recognition by the seller of an overlapped route segment within the identified commuting routes;
   selecting a pickup point along the overlapped route segment;
   loading the buyer ordered product to a mobile pick up station at a warehouse that is in communication with the server;
   dispatching the mobile pickup station to the selected pickup point, the mobile pickup station containing the product ordered by the buyer; and
   stationing the mobile pick up station at the pick up point, the mobile pick up station being removable from the pick up point; whereby
   the buyer may pick up the order from the mobile pick up station.

2. The method of claim 1, wherein selecting a pickup point further comprises:
   receiving a channel width from the buyer;
   calculating a channel area using the channel width and the route information;
   determining a set of pickup points from the plurality of pickup points based on the channel area; and
   selecting from the set of pickup points a pickup point.

3. The method of claim 1, wherein selecting a pick up point being further determined by using an approximate buyer route concentration based on route usage.

4. The method of claim 1, further comprising:
   receiving a specification of the buyer's preferred products from the buyer by the server; and
   ordering a product for the buyer by the server using the specification.

5. The method of claim 4, further comprising:
   receiving a date from the buyer by the server; and
   delivering the product by the server using a mobile pick station according to the date.

6. The method for scheduling and delivery of a product to a buyer along the buyer's commuting route as set forth in claim 4, further comprising:
   the buyer accessing a server via a communications network; and
   receiving route information from the buyer by the server via the communications network.

7. The method of claim 1, further comprising reminding the buyer via email that a product delivery is scheduled at the pickup point.

8. The method of claim 1, further comprising reminding the buyer telephonically that a product delivery is scheduled at the pickup point.

9. The method of claim 1, wherein;
   the mobile pickup station includes a plurality of lockers for containing products, each of the plurality of lockers having a unique access code; and giving the buyer an access code for a locker containing the buyer's product, the locker selected from the plurality of lockers.

10. The method in claim 1 further comprising:
determining by the server prior to dispatching the mobile pickup station a station time for the mobile pickup station, the station time starting at a specific time and ending at a second specific time;
stationing the mobile pick up station at the pick up point for the station time;
the mobile pick up station being removable from the pick up point when the station time ends;
releasing the product by an operator of the mobile pickup station when the buyer or his agent arrives at the pick up point to pick up the product; and
returning the product to a warehouse by the mobile pickup station if the buyer or his agent fails to arrive at the pickup point to pickup the product during the station time.

11. The method of claim 10 wherein the station time ends when the product is released.

12. The method in claim 1 wherein the selecting of a pickup point further comprising:
displaying by the server a map, the map displaying a plurality of pickup points selected by the server; and
selecting by the buyer from the plurality of pickup points a pickup point.

13. The method in claim 12 further comprising:
determining by the server prior to dispatching the mobile pickup station a station time for the mobile pickup station, the station time starting at a specific time and ending at a second specific time;
stationing the mobile pick up station at the pick up point for the station time;
the mobile pick up station being removable from the pick up point when a the station time ends;
releasing the product by an operator of the mobile pickup station when the buyer or his agent arrives at the pick up point to pick up the product; and
returning the product to a warehouse by the mobile pickup station if the buyer or his agent fails to arrive at the pickup point to pickup the product during the station time.

14. The method of claim 13 wherein the station time ends when the product is released.

15. The method of claim 14, further comprising:
receiving a specification of the buyer's preferred products from the buyer by the server; and
ordering a product for the buyer by the server using the specification.

16. The method of claim 15, further comprising:
receiving a date from the buyer by the server; and
delivering the product by the server using a mobile pick station according to the date.

17. A method for scheduling and delivery of a product to a buyer by a server using a third party seller affiliate, comprising:
receiving an order for a product from a buyer;
receiving commuting route information from the buyer, the commuting route information including a beginning address and an ending address;
identifying a commuting route of the buyer comprising selecting at least one commuting route parameter and calculating by the server the commuting route based on the commuting route parameter, the commuting route connecting the beginning address and the ending address;
receiving commuting route information from a second buyer, the second buyer commuting route information including a second buyer beginning address and a second buyer ending address;
identifying a commuting route of the second buyer comprising selecting at least one second buyer commuting route parameter and calculating for the second buyer by the server a second buyer commuting route based on the second buyer commuting route parameter, the second buyer commuting route connecting the second buyer beginning address and the second buyer ending address;
recognition by the server of an overlapped route segment within the identified commuting routes;
selecting a pickup point along the overlapped route segment;
selecting a third party seller affiliate from a plurality of third party sellers based on the location of the pickup point;
loading the buyer ordered product to a mobile pick up station at a third party affiliate's warehouse by the third party affiliate;
dispatching by the third party seller affiliate the mobile pickup station to the selected pickup point, the mobile pickup station containing the products ordered by the buyer; and
stationing the mobile pick up station at the pick up point;
the mobile pick up station being removable from the pick up point; whereby
the buyer may pick up the order from the mobile pick up station.

18. The method for scheduling and delivery of a product to a buyer by a server using a third party seller affiliate as set forth in claim 17, further comprising:
the buyer accessing the server via a communications network;
receiving an order for a product from a buyer by the server via the communications network; and
receiving route information from a buyer by the server via the a communications network.

19. A method for scheduling and delivery of a product to a buyer along the buyer's commuting route, comprising:
receiving a buyer's commuting route information from the buyer, the route information including a beginning address and an ending address;
receiving a channel width from the buyer;
calculating a channel area using the channel width and the route information;
determining a set of pickup points from a plurality of pickup points based on the channel area;
selecting from the set of pickup points a pickup point;
dispatching a mobile pickup station to the pickup point, the mobile pickup station containing a product ordered by the buyer; and
stationing the mobile pick up station at the pick up point, the mobile pick up station being removable from the pick up point; whereby
the buyer may pick up the order from the mobile pick up station.

20. The method of claim 19, wherein the plurality of pickup points is determined using an approximate buyer route concentration based on route usage.

21. The method of claim 19, further comprising:
receiving a plurality of routes from a plurality of buyers; and
determining the plurality of pickup points based on the plurality of routes.

22. The method for scheduling and delivery of a product to a buyer along the buyer's commuting route as set forth in claim 19, further comprising:
 the buyer accessing a server via a communications network;
 receiving route information from the buyer by the server via the communications network; and
 receiving a channel width from the buyer by the server via the communications network.

23. A data processing system adapted to schedule and deliver a product to a buyer along a commuting route, comprising:
 a processor;
 a memory operably coupled to the processor and having program instructions stored therein, the processor being operable to execute the program instructions, the program instructions including:
 receiving an order of a product from a buyer by a seller;
 receiving commuting route information from the buyer by a server, the commuting route information including a beginning address and an ending address;
 identifying a commuting route of the buyer comprising selecting at least one commuting route parameter and calculating by the server the commuting route based on the commuting route parameter, the commuting route connecting the beginning address and the ending address;
 receiving commuting route information from a second buyer of the seller by the server, the second buyer commuting route information including a second buyer beginning address and a second buyer ending address;
 identifying a commuting route of the second buyer comprising selecting at least one second buyer commuting route parameter and calculating for the second buyer by the server a second buyer commuting route based on the second buyer commuting route parameter, the second buyer commuting route connecting the second buyer beginning address and the second buyer ending address;
 recognition by the seller of an overlapped route segment within the identified commuting routes; and
 selecting a pickup point along the overlapped route segment;
 administrating loading of the buyer ordered product to a mobile pick up station at a warehouse that is in communication with the server;
 administrating dispatching of the mobile pickup station to the selected pickup point, the mobile pickup station containing the product ordered by the buyer; and
 administrating stationing of the mobile pick up station at the pick up point;
 the mobile pick up station being removable from the pick up point; whereby
 the buyer may pick up the order from the mobile pick up station.

24. The data processing system of claim 23, wherein the program instructions for selecting a pickup point further include:
 receiving a channel width from the buyer;
 calculating a channel area using the channel width and the route information;
 determining a set of pickup points from the plurality of pickup points based on the channel area;
 selecting from the set of pickup points a pickup point.

25. The data processing system of claim 23, the program instructions further including:
 selecting a pick up point by using an approximate buyer route concentration based on route usage.

26. The data processing system of claim 23, the program instructions further including:
 receiving a specification of the buyer's preferred products from the buyer by the server; and
 ordering a product for the buyer by the server using the specification.

27. The data processing system of claim 26, the program instructions further including:
 receiving a date from the buyer by the server; and
 delivering the product by the server according to the date.

28. The data processing system of claim 23, the program instructions further including reminding the buyer via email that a product delivery is scheduled at the pickup point.

29. The data processing system of claim 23, the program instructions further including reminding the buyer telephonically that a product delivery is scheduled at the pickup point.

30. The data processing system of claim 23, wherein the program instructions further include:
 determining by the server prior to dispatching the mobile pickup station a station time for the mobile pickup station, the station time starting at a specific time and ending at a second specific time;
 administrating stationing of the mobile pick up station at the pick up point for the station time;
 the mobile pick up station being removable from the pick up point when the station time ends;
 administrating releasing of the product by an operator of the mobile pickup station when the buyer or his agent arrives at the pick up point to pick up the product; and
 administrating returning of the product to a warehouse by the mobile pickup station if the buyer or his agent fails to arrive at the pickup point to pickup the product during the station time.

31. The data processing system of claim 30, wherein the program instructions further include:
 the station time ends when the product is released.

32. The data processing system of claim 23 wherein the program instructions for selecting a pickup point further include:
 displaying by the server a map, the map displaying a plurality of pickup points selected by the server; and
 selecting by the buyer from the plurality of pickup points a pickup point.

33. The data processing system of claim 32, wherein the program instructions further including:
 determining by the server prior to dispatching the mobile pickup station a station time for the mobile pickup station, the station time starting at a specific time and ending at a second specific time;
 administrating stationing of the mobile pick up station at the pick up point for the station time;
 the mobile pick up station being removable from the pick up point when the station time ends;
 administrating releasing of the product by an operator of the mobile pickup station when the buyer or his agent arrives at the pick up point to pick up the product; and
 administrating returning of the product to a warehouse by the mobile pickup station if the buyer or his agent fails to arrive at the pickup point to pickup the product during the station time.

34. The data processing system of claim 33, wherein the program instructions further including:
 the station time ends when the product is released.

35. The data processing system of claim 34, the program instructions further including:
 receiving a specification of the buyer's preferred products from the buyer by the server; and ordering a product for the buyer by the server using the specification.

36. The data processing system of claim 35, the program instructions further including:
receiving a date from the buyer by the server; and
delivering the product by the server using a mobile pick station according to the date.

37. A data processing system adapted to schedule and deliver a product to a buyer by a server using a third party seller affiliate, comprising:
a processor;
a memory operably coupled to the processor and having program instructions stored therein, the processor being operable to execute the program instructions, the program instructions including:
receiving an order for a product from a buyer;
receiving commuting route information from the buyer, the route information including a beginning address and an ending address;
identifying a commuting route of the buyer comprising selecting at least one commuting route parameter and calculating by the server the commuting route based on the commuting route parameter, the commuting route connecting the beginning address and the ending address;
receiving commuting route information from a second buyer, the second buyer commuting route information including a second buyer beginning address and a second buyer ending address;
identifying a commuting route of the second buyer comprising selecting at least one second buyer commuting route parameter and calculating for the second buyer by the server a second buyer commuting route based on the second buyer commuting route parameter, the second buyer commuting route connecting the second buyer beginning address and the second buyer ending address;
recognition of an overlapped route segment within the identified commuting routes;
selecting a pickup point along the overlapped route segment; and
selecting a third party seller affiliate from a plurality of third party sellers based on the location of the pickup point;
administrating loading of the buyer ordered product to a mobile pick up station at a third party affiliate's warehouse by the third party affiliate;
administrating dispatching by the third party seller affiliate of the mobile pickup station to the selected pickup point, the mobile pickup station containing the products ordered by the buyer; and
administrating stationing of the mobile pick up station at the pick up point;
the mobile pick up station being removable from the pick up point;
whereby the buyer may pick up the order from the mobile pick up station.

38. A method for scheduling and delivery of a product comprising:
receiving an order of a product from a buyer by a server;
receiving commuting route information from the buyer and at least one other buyer;
each of the commuting route information including a beginning address and an ending address;
identifying for each buyer a commuting route comprising selecting at least one commuting route parameter and calculating for the buyer by the server the commuting route based on the commuting route parameter, the commuting route connecting the buyer beginning address and the buyer ending address;
generating by the server an overlapped route segment within the identified commuting routes;
selecting a pickup point along the overlapped route segment;
loading the buyer ordered product to a mobile pick up station at a warehouse that is in communication with the server;
dispatching the mobile pickup station to the selected pickup point, the mobile pickup station containing the product ordered by the buyer; and
stationing the mobile pick up station at the pick up point;
the mobile pick up station being removable from the pick up point; whereby
a buyer may pick up the order from the mobile pick up station.

39. The method in claim 38 further comprising:
determining by the server prior to dispatching the mobile pickup station a station time for the mobile pickup station, the station time starting at a specific time and ending at a second specific time;
stationing the mobile pick up station at the pick up point for the station time;
the mobile pick up station being removable from the pick up point when the station time ends;
releasing the product by an operator of the mobile pickup station when to the buyer or his agent arrives at the pick up point to pick up the product; and
returning the product to a warehouse by the mobile pickup station if the buyer or his agent fails to arrive at the pickup point to pickup the product during the station time.

40. The method of claim 39 wherein the station time ends when the product is released.

41. A data processing system adapted to schedule and deliver a product comprising:
a processor; and
a memory operably coupled to the processor and having program instructions stored therein, the processor being operable to execute the program instructions, the program instructions including:
receiving an order of a product from a buyer by a server;
receiving commuting route information from the buyer and at least one other buyer;
each of the commuting route information including a beginning address and an ending address;
identifying for each buyer a commuting route comprising selecting at least one commuting route parameter and calculating for the buyer by the server the commuting route based on the commuting route parameter, the commuting route connecting the buyer beginning address and the buyer ending address;
generating by the server an overlapped route segment within the identified commuting routes;
selecting a pickup point along the overlapped route segment;
administrating loading of the buyer ordered product to a mobile pick up station at a warehouse that is in communication with the server;
administrating dispatching of the mobile pickup station to the selected pickup point, the mobile pickup station containing the product ordered by the buyer; and
administrating stationing of the mobile pick up station at the pick up point;

the mobile pick up station being removable from the pick up point; whereby a buyer may pick up the order from the mobile pick up station.

42. The data processing system of claim 41, wherein the program instructions further include:

determining by the server prior to dispatching the mobile pickup station a station time for the mobile pickup station, the station time starting at a specific time and ending at a second specific time;

administrating stationing of the mobile pick up station at the pick up point for the station time;

the mobile pick up station being removable from the pick up point when the station time ends;

administrating releasing of the product by an operator of the mobile pickup station when the buyer or his agent arrives at the pick up point to pick up the product; and administrating returning of the product to a warehouse by the mobile pickup station if the buyer or his agent fails to arrive at the pickup point to pickup the product during the station time.

43. The data processing system of claim 42 wherein the program instructions including:

the station time ends when the product is released.

44. A method for scheduling and delivery of a product comprising:

receiving an order of a first product from a first buyer by a server;

receiving first commuting route information from said first buyer and second commuting route information from a second buyer;

said first commuting route information including a first beginning address and a first ending address;

said second commuting route information including a second beginning address and a second ending address;

identifying for said first buyer a first commuting route comprising selecting at least one first commuting route parameter and calculating for said first buyer by said server said first commuting route based on said first commuting route parameter, said first commuting route connecting said first buyer beginning address and said first buyer ending address;

identifying for said second buyer a second commuting route of said second buyer comprising selecting at least one second commuting route parameter and calculating for said second buyer by said server said second commuting route based on said second commuting route parameter, said second commuting route connecting said second buyer beginning address and said second buyer ending address;

generating by said server an overlapped route segment between said first and second identified commuting routes;

selecting a pickup point along said overlapped route segment;

loading said first buyer ordered product to a mobile pick up station at a warehouse that is in communication with the server;

dispatching said mobile pickup station to said selected pickup point, said mobile pickup station containing said first product ordered by said first buyer; and stationing said mobile pick up station at said pick up point;

said mobile pick up station being removable from said pick up point; whereby said first buyer may pick up said order from said mobile pick up station.

45. The method in claim 44 further comprising:

determining by the server prior to dispatching the mobile pickup station a station time for the mobile pickup station, the station time starting at a specific time and ending at a second specific time; and stationing said mobile pick up station at said pick up point for said station time;

said mobile pick up station being removable from said pick up point when said station time ends;

releasing said product to said first buyer when said first buyer arrives at said pick up point to pick up said product.

46. The method of claim 45 wherein:

said station time ends when said first buyer picks up said product.

47. The method in claim 45 wherein:

said first buyer designates a third party recipient; and releasing said first product to said third party recipient when said third party recipient arrives at said mobile pick up point to pick up said order.

48. The method of claim 47, further comprising:

receiving a specification of said first buyer's preferred products from said first buyer by said server; and ordering a product for said first buyer by said server using said specification.

49. The method of claim 48, further comprising:

receiving a date from said first buyer by said server; and delivering said first product by said server using a mobile pick station according to said date.

50. The method of claim 47 wherein:

said station time ends when said third party recipient picks up said product.

51. A data processing system adapted to schedule and deliver a product comprising:

a processor; and a memory operably coupled to said processor and having program instructions stored therein, said processor being operable to execute said program instructions, said program instructions including:

receiving an order of a first product from a first buyer by a server;

a receiving first commuting route information from said first buyer and second commuting route information from a second buyer;

said first commuting route information including a first beginning address and a first ending address;

said second commuting route information including a second beginning address and a second ending address;

identifying for said first buyer a first commuting route comprising selecting at least one first commuting route parameter and calculating for said first buyer by said server said first commuting route based on said first commuting route parameter, said first commuting route connecting said first buyer beginning address and said first buyer ending address;

identifying for said second buyer a second commuting route of said second buyer comprising selecting at least one second commuting route parameter and calculating for said second buyer by said server said second commuting route based on said second commuting route parameter, said second commuting route connecting said second buyer beginning address and said second buyer ending address;

generating by said server an overlapped route segment between said first and second identified commuting routes;

selecting a pickup point along said overlapped route segment;
administrating loading of said first buyer ordered product to a mobile pick up station at a warehouse that is in communication with the server;
administrating dispatching of said mobile pickup station to said selected pickup point, said mobile pickup station containing said first product ordered by said first buyer; and
administrating stationing of said mobile pick up station at said pick up point;
said mobile pick up station being removable from said pick up point; whereby said first buyer may pick up said order from said mobile pick up station.

52. The data processing system of claim 51, wherein said program instructions further include:
determining by the server prior to dispatching the mobile pickup station a station time for the mobile pickup station, the station time starting at a specific time and ending at a second specific time;
administrating stationing of said mobile pick up station at said pick up point for said station time;
said mobile pick up station removable from said pick up point when said station time ends; and
administrating releasing of said product to said first buyer when said first buyer arrives at said pick up point to pick up said product during the station time.

53. The data processing system of claim 52 wherein said program instructions including:
said station time ends when said first buyer picks up said product.

54. The data processing system of claim 52 wherein said program instructions including:
said first buyer designating a third party recipient and releasing said product to said third party recipient when said third party recipient arrives at said mobile pick up point to pick up said order.

55. The data processing system of claim 54, said program instructions further including:
receiving a specification of said first buyer's preferred products from said buyer by said server; and
ordering a product for said first buyer by said server using said specification.

56. The data processing system of claim 55, said program instructions further including:
receiving a date from said first buyer by said server; and
delivering said product by said server using a mobile pick station according to said date.

57. The data processing system of claim 54 wherein said program instructions including:
said station time ends when said third party recipient picks up said product.

58. A method for scheduling and delivery of a product to a buyer along a commuting route, comprising:
receiving an order of a product from a buyer;
receiving commuting route information from the buyer by a server, the commuting route information including a beginning address and an ending address;
identifying a commuting route of the buyer comprising selecting at least one commuting route parameter and calculating by the server the commuting route based on the commuting route parameter, the commuting route connecting the beginning address and the ending address;
selecting a pickup point along the identified commuting route, including:
receiving a channel width from the buyer;
calculating a channel area using the channel width and the route information;
determining a set of pickup points from the plurality of pickup points based on the channel area; and
selecting from the set of pickup points a pickup point;
loading the buyer ordered product to a mobile pick up station at a warehouse that is in communication with the server;
dispatching the mobile pickup station to the selected pickup point, the mobile pickup station containing the product ordered by the buyer; and
stationing the mobile pick up station at the pick up point, the mobile pick up station being removable from the pick up point; whereby
the buyer may pick up the order from the mobile pick up station.

59. A data processing system adapted to schedule and deliver a product to a buyer along a commuting route, comprising:
a processor;
a memory operably coupled to the processor and having program instructions stored therein, the processor being operable to execute the program instructions, the program instructions including:
receiving an order of a product from a buyer;
receiving commuting route information from the buyer by a server, the commuting route information including a beginning address and an ending address;
identifying a commuting route of the buyer comprising selecting at least one commuting route parameter and calculating by the server the commuting route based on the commuting route parameter, the commuting route connecting the beginning address and the ending address;
selecting a pickup point along the identified commuting route, including;
receiving a channel width from the buyer;
calculating a channel area using the channel width and the route information;
determining a set of pickup points from the plurality of pickup points based on the channel area; and
selecting from the set of pickup points a pickup point;
administrating loading of the buyer ordered product to a mobile pick up station at a warehouse that is in communication with the server;
administrating dispatching of the mobile pickup station to the selected pickup point, the mobile pickup station containing the product ordered by the buyer; and
administrating stationing of the mobile pick up station at the pick up point;
the mobile pick up station being removable from the pick up point; whereby
the buyer may pick up the order from the mobile pick up station.

* * * * *

UNITED STATES PATENT AND TRADEMARK OFFICE
CERTIFICATE OF CORRECTION

| | |
|---|---|
| PATENT NO. | : 7,110,958 B2 |
| APPLICATION NO. | : 09/733873 |
| DATED | : September 19, 2006 |
| INVENTOR(S) | : Ping Yang |

Page 1 of 1

It is certified that error appears in the above-identified patent and that said Letters Patent is hereby corrected as shown below:

Col. 17, line 61, claim 1, delete "by a seller".

Col. 18, line 5, claim 1, delete "of the seller".

Col. 18, line 16, claim 1, replace "seller" with --server--.

Col. 21, line 18, claim 23, delete "by a seller".

Col. 21, line 28, claim 23, delete "of the seller".

Col. 21, line 39, claim 23, replace "seller" with --server--.

Signed and Sealed this

Tenth Day of March, 2009

JOHN DOLL
*Acting Director of the United States Patent and Trademark Office*